United States Patent [19]
Mashinsky

[11] Patent Number: 6,005,926
[45] Date of Patent: Dec. 21, 1999

[54] METHOD AND SYSTEM FOR GLOBAL COMMUNICATIONS NETWORK MANAGEMENT

[75] Inventor: Alexander Mashinsky, New York, N.Y.

[73] Assignee: ANIP, Inc., Carson City, Nev.

[21] Appl. No.: 08/927,443

[22] Filed: Sep. 11, 1997

Related U.S. Application Data

[63] Continuation-in-part of application No. 08/920,567, Aug. 29, 1997, abandoned.

[51] Int. Cl.⁶ .................................................. H04M 15/00
[52] U.S. Cl. .......................... 379/114; 379/112; 379/115; 379/121
[58] Field of Search ..................................... 379/111, 114, 379/115, 121, 124, 144, 219, 220, 221

[56] References Cited

U.S. PATENT DOCUMENTS

| | | | |
|---|---|---|---|
| 4,068,101 | 1/1978 | Chemarin | 179/17 BG |
| 4,313,035 | 1/1982 | Jordan et al. | 179/18 BE |
| 4,313,036 | 1/1982 | Jabara et al. | 179/18 AD |
| 4,594,477 | 6/1986 | Noirot . | |
| 5,012,515 | 4/1991 | McVitie | 380/49 |
| 5,027,387 | 6/1991 | Moll | 379/112 |
| 5,163,042 | 11/1992 | Ochiai | 379/220 |
| 5,353,331 | 10/1994 | Emery et al. | 379/58 |
| 5,408,518 | 4/1995 | Yunoki | 379/67 |
| 5,408,526 | 4/1995 | McFarland et al. | 379/202 |
| 5,414,752 | 5/1995 | Jonsson | 379/58 |
| 5,425,084 | 6/1995 | Brinskele | 379/112 |

(List continued on next page.)

FOREIGN PATENT DOCUMENTS

| | | | |
|---|---|---|---|
| WO94/01350 | 1/1992 | United Kingdom | H04M 3/42 |
| WO94/28683 | 12/1994 | United Kingdom | H04Q 3/00 |
| WO 93/16543 | 8/1993 | WIPO . | |
| WO 93/16544 | 8/1993 | WIPO . | |
| WO 93/16546 | 8/1993 | WIPO . | |

OTHER PUBLICATIONS

Tao et al., "Internet Access via Baseband and Broadband ISDN Gateways", Dec. 4, 1994, (IEEE).

(List continued on next page.)

*Primary Examiner*—Curtis A. Kuntz
*Assistant Examiner*—Binh K Tieu
*Attorney, Agent, or Firm*—Pennie & Edmonds LLP

[57] ABSTRACT

A system and method for flexible and efficient routing of communications transmissions is disclosed. Service providers submit information comprising cost and service parameter data to a centralized server node. The server node evaluates the information and generates a rate-table database comprising efficient routing paths for connecting transmissions between any two locations in a communications switching network. The server may substantially optimize its rate-table database with respect to one or more parameters, such as price, network utilization, return traffic volumes, and others. Service requesters submit service requests to the centralized server node. The server node identifies efficient routes which meet the requesters' requirements and brokers sales of communication (or connect) time from the service providers to the service requesters. The telecommunications node may be programmed to dynamically monitor current volume and sell or buy communication bandwidth on the basis of the actual and predicted requirements for connect time. When a carrier wishes to establish communication via a route purchased through the global network, it passes supervision to a local telecommunications node which establishes transmission via a routing path for which the carrier has purchased connect time. When necessary, the system employs particular data messages to inform a switch in the routing path that an incoming communication transaction is in transit to a different location, and is not for termination at the location of the switch. This allows a switch to distinguish terminating traffic from transit traffic and set rates for transit traffic without invoking settlement agreement accounting rates.

11 Claims, 16 Drawing Sheets

U.S. PATENT DOCUMENTS

| | | | |
|---|---|---|---|
| 5,425,091 | 6/1995 | Josephs | 379/201 |
| 5,438,616 | 8/1995 | Peoples | 379/201 |
| 5,506,887 | 4/1996 | Emery et al. | 379/58 |
| 5,515,425 | 5/1996 | Penzias et al. | 379/114 |
| 5,606,602 | 2/1997 | Johnson et al. | 379/115 |
| 5,608,782 | 3/1997 | Carlsen et al. | 379/63 |
| 5,608,786 | 3/1997 | Gordon | 379/100 |
| 5,675,636 | 10/1997 | Gray | 379/114 |
| 5,706,507 | 1/1998 | Schloss | 395/615 |
| 5,790,642 | 8/1998 | Taylor et al. | 379/115 |
| 5,825,858 | 10/1998 | Shaffer et al. | 379/120 |

OTHER PUBLICATIONS

"Survey: Telecoms", in *The Economist*, vol. 344, No.8034 (Sep. 13, 1997), pp. 56/1–56/34.

"Auctioning Telephone Calls", *The Economist*, vol. 344, No.8032 (Aug. 30, 1997), pp. 47–48.

Book Review, Impact of Liberalization On Resale And Callback, Telecommunications Policy, vol. 21, No. 3, pp. 275–276 (1997).

Brennan, Industry Parallel Interconnection Agreements, Information Economics and Policy vol. 9, No. 2, pp. 133–149 (1997).

R. Frieden, "Chapter 9: The International Telecommunications Toll Revenue Division Process", in *International Telecommunications Handbook* (1996), pp. 133–148, Artech House.

Y. Levy, S. Durinovic–Johri, and R. A. Milito, "Dynamic Network Call Distribution with Periodic Updates", in *Teletrafic Science and Engineering*, vol. 1a (J. Labetoulle, and J.W. Roberts, ed.)(1994), Elsevier.

Raif O. Onvural, *Asynchronous Transfer Mode Networks: Peformance Issues* (1994), Section 6.3–6.4, Artech House.

B. Yuhas & N Ansari ed., *Neural Networks in Telecommunications* (1994), Chapter 1, Kluwer.

Globerman et al., Competition In Public Long–distance Telephone Markets In Canada, Telecommunications Policy, vol. 17, No. 4, pp. 297–312 (1993).

R. Frieden, "International Toll Revenue Division: Tackling the Inequities and Inefficiencies", in *Telecommunications Policy*, vol. 17, No.3 (Apr. 1993), pp. 221–133, Butterworth– Heinemann.

R.J. Horrocks & R.W.A. Scarr, "Chapter 24: Tariff Principles", in *Future Trends in Telecommunications*, 1993, pp. 387–392, J. Whitaker & Sons.

K. Cheong & M. Mullins, "International Telephone Service Imbalances: Accounting Rates and Regulatory Policy", Telecommunications Policy, vol. 15, No.2 (Apr. 1991), pp. 107–118.

R.M.Frieden, "Accounting Rates: The Business of International Telecommunications and the Incentive to Cheat", 43 Federal Communications L.J. 111 (1991).

K.B. Stanley, "Balance of Payments, Deficits, and Subsidies in International Communications Services: A New Challenge to Regulation", in 43 Administrative Law Review 411 (Summer 1991).

N.F. Maxemchuk & M. El Zarki, "Routing and Flow Control in High–Speed Wide–Area Networks", in *Proceedings of the IEEE*, vol.78, No.1 (Jan. 1990), pp. 204–221, IEEE.

B. Warfield & P. Sember, "Prospects for the Use of Artificial Intelligence in Real–Time Network Traffic Management", in *Computer Networks and ISDN Systems*, vol.20 (1990), pp. 163–169, Elsevier Science.

A. Girard, *Routing and Dimensioning in Circuit–Switched Networks*, (1990), Addison–Wesly, (Table of Contents only).

J. Potvin, & S.F. Smith, "Flexible Systems for the Design of Heuristic Algorithms in Complex or Domains", in Impact of Recent Computer Advances on Operations Research (1989), pp. 332–344, Elsevier Science.

G.L. Schultz & R.R. Meyer, "A Flexible Parallel Algorithm for Block–Constrained Optimization Problems", in *Impact of Recent Computer Advances on Operations Research* (1989), pp. 82–91.

M. Schwartz, *Telecommunication Networks* (1987), Sec.6–2, Addison–Wesley.

INITIAL TRADING DATE(INFORMATION DUE 3 DAYS PRIOR TO): 3/1/97

CARRIER: USAGLOBAL    ID #: A45B6F9    PASSWORD: *******    SUBMITTED: 2/24/97

U.S. TO*:

| | QUALITY A# PRICE/CAPACITY LIST: | | | |
|---|---|---|---|---|
| | 1k–100k** TIME AVAILABLE # CIRCUITS | | 101k–500k** TIME AVAILABLE # CIRCUITS | |
| AFGHANISTAN (CC 93) | 1.200 M-F 17-3/SS all | 24 | 1.185 M-F 14-10/SS all | 5 |
| | 1k–300k** | | 300k–800k** | |
| ALBANIA (CC 355) | 0.625 M-F 22-8/SS12-18 | 175 | 0.598 M-F 20-24/SS5-18 | 100 |
| Tirane (42) | 0.601 M-F 22-8/SS12-18 | 90 | 0.555 M-F 20-24/SS5-18 | 100 |
| Durres (52) | 0.625 M-F 22-8/SS12-18 | 50 | 0.598 M-F 20-24/SS5-18 | 100 |
| Elbassan (545) | 0.625 M-F 22-8/SS12-18 | 25 | 0.598 M-F 20-24/SS5-18 | 100 |
| Korce (824) | 0.625 M-F 22-8/SS12-18 | 50 | 0.598 M-F 20-24/SS5-18 | 100 |
| Shkoder (224) | 0.625 M-F 22-8/SS12-18 | 90 | 0.598 M-F 20-24/SS5-18 | 100 |

*CARRIER WILL CHOOSE U.S./FOREIGN ORIGINATION, CAPACITY RANGES AND QUALITY DESCRIPTION OFFERED ON TEMPLATE, AND WILL ENTER SPECIFIC DATA ACCORDINGLY.
**CARRIER WILL CHOOSE CAPACITY NUMBERS, IN MULTIPLES OF 100k.
RATES WILL BE GUARANTEED TO MEET DEFINING QUALITY CONSIDERATIONS.

FIG.3A

CUSTOMER ID: 000151
PASSWORD: EX4936
ORIGINATING: US
TERMINATING: HUNGARY
TERMINATING AREA CODES: ALL
REQUIRE LOCAL TERMINATION: NO
REQUIRE SETTLEMENT: YES
HOURS OF OPERATION: 0300 TO 1600
NUMBER OF MINUTES (PER MONTH): 200k
QUALITY: A (TOLL)
MAXIMUM PDD: 12 SECONDS
ALLOW PRIVATE LINE: YES
IF NO MATCH, SORT BY CLOSEST: SIZE OF COMPANY
LENGTH OF CONTRACT: 6 MOS.
ACCEPTABLE CARRIERS: ALL

FIG.3B

| SERVICE: VOICE | | | |
|---|---|---|---|
| QUALITY A:<br>Country | USA<br>Global | RSL (ITC) | Primus |
| AFGHANISTAN (CC 93) | 1.2010 | 1.6047 | 1.2500 |
| ALBANIA (CC 355) | 0.6195 | 0.5288 | 0.5540 |
| Tirane (42) | 0.6003 | 0.5288 | 0.5540 |
| Durres (52) | 0.6195 | 0.5288 | 0.5540 |
| Elbassan (545) | 0.6195 | 0.5288 | 0.5540 |
| Korce (824) | 0.6195 | 0.5288 | 0.5540 |
| Shkoder (224) | 0.6195 | 0.5288 | 0.5540 |
| ALGERIA (213) rest | 0.6589 | 0.4650 | 0.5540 |
| Bejaia (5) | | | |
| AMERICAN SAMOA (all) | 0.6667 | 0.4984 | 0.6510 |
| ANDORRA (FRANCE) (all) | 0.4057 | 0.2438 | 0.5000 |

FIG.4

| ROUTING | PRICE/MIN. | Q | R | TOTAL CAPACITY | AVAIL. CAP. | ALLOCATED CAP. |
|---|---|---|---|---|---|---|
| US-GERMANY | 18 ¢ | A | B | 8 | 2 | 6 |
| US-GERMANY | 22 ¢ | A | B | 40 | 4 | 36 |
| US-GERMANY | 23 ¢ | A | B | 6 | 4 | 2 |
| US-GERMANY | 28 ¢ | A | B | 16 | 12 | 4 |
| US-GERMANY | 32 ¢ | A | B | 9 | 8 | 1 |
| US-GERMANY | 50 ¢ | A | B | 27 | 12 | 15 |

FIG.6A

| ROUTING | PRICE/MIN. | Q | R | TOTAL CAPACITY | AVAIL. CAP. | ALLOCATED CAP. |
|---|---|---|---|---|---|---|
| US-GERMANY | 18 ¢ | A | B | 8 | 0 | 8 |
| US-GERMANY | 22 ¢ | A | B | 40 | 0 | 40 |
| US-GERMANY | 23 ¢ | A | B | 6 | 0 | 6 |
| US-GERMANY | 28 ¢ | A | B | 16 | 12 | 4 |
| US-GERMANY | 32 ¢ | A | B | 9 | 8 | 1 |
| US-GERMANY | 50 ¢ | A | B | 27 | 12 | 15 |

FIG.6B

| ROUTING | PRICE/MIN. | Q | R | TOTAL CAPACITY | AVAIL. CAP. | ALLOCATED CAP. |
|---|---|---|---|---|---|---|
| US-GERMANY | 18 ¢ | A | B | 8 | 2 | 6 |
| US-GERMANY | 22 ¢ | A | B | 40 | 4 | 36 |
| US-GERMANY | 28 ¢ | A | B | 6 | 4 | 2 |
| US-GERMANY | 28 ¢ | A | B | 16 | 12 | 4 |
| US-GERMANY | 32 ¢ | A | B | 9 | 8 | 1 |
| US-GERMANY | 50 ¢ | A | B | 27 | 12 | 15 |

FIG.6C

METHOD AND SYSTEM FOR GLOBAL COMMUNICATIONS NETWORK MANAGEMENT

This application is a continuation-in-part of U.S. patent application filed on Aug. 29, 1997, Ser. No. 08/920,567, now abandoned, which is hereby incorporated by reference.

BACKGROUND OF THE INVENTION

The cost of a long distance telephone call is usually paid by the calling party rather than by the called party. Payment for the call is typically collected from the calling party by the carrier that originated the service, either directly or through the agency of the caller's local telephone service provider. Consequently, when a call is placed from a first location served by an originating carrier to a second location served by a different terminating carrier, provision must be made to share with the terminating carrier some of the revenue collected by the originating carrier from the calling party.

For international telephone calls, this revenue sharing has traditionally been accomplished through the use of settlement agreements. Settlement agreements typically establish an accounting rate related to the cost of connecting the call between the countries, and specify how the accounting rate will be split between the two carriers. This split is typically 50-50.

For example, assume that a United States carrier and an overseas carrier negotiate a settlement agreement with a one dollar per minute accounting rate and a 50-50 revenue split. In accordance with the agreement, the U.S. carrier must pay 50 cents for every minute of connect time to called locations serviced by the overseas carrier. Conversely, the overseas carrier must pay 50 cents for every minute of connect time on calls terminated by the U.S. carrier.

As has been recognized, however, the negotiated accounting rate is frequently significantly higher than the actual cost of completing the international call. See, e.g., Frieden, Accounting Rates: The Business of International Telecommunications and the Incentive to Cheat, 43 Federal Communications Law Journal 111, 117, which is hereby incorporated by reference. For this reason, and because outbound calling volumes from the United States are significantly greater than inbound calling volumes from many foreign countries, U.S. carriers make large outbound payments to overseas carriers. In large measure, these charges are ultimately passed on to rate payers.

This payment imbalance is exacerbated when overseas carriers route inbound U.S. traffic under their control via private telephone lines into the United States. In this way, the overseas carriers are able to avoid paying high accounting rate settlements for calls to the United States from their countries, while receiving high accounting rate settlements from U.S. carriers who are forced to route outbound U.S. traffic through the overseas carrier because the overseas carrier is a monopolist in its home country. Moreover, overseas carriers often employ these alternative less-expensive routings for inbound U.S. traffic despite express contractual provisions in settlement agreements prohibiting such behavior.

To date, U.S. carriers have been forced to suffer such payment imbalances and have no immediate way to respond to breaches of contract by overseas carriers because of the significant time and expense required to reconfigure the global network to reroute calling traffic. The cumbersome reconfiguration process gives foreign carriers the opportunity to route inbound U.S. traffic via private lines, and otherwise run up settlement balances, without fear of retaliation from U.S. carriers.

More generally, this inflexible routing structure precludes telephone service providers from taking advantage of fluctuations in world-wide telephone rates. It would be desirable to provide a way for dynamic routing in response to rate changes so as to pass the savings on to the consumer. There is also a need to provide telephone companies with means to dynamically purchase and sell blocks of telephone connection bandwidth.

The need for flexible allocation of connection routes and for an ability to trade connection bandwidth accordingly exists not only in the international arena but in any internal market allowing competition in the field of communications.

SUMMARY OF THE INVENTION

The present invention provides a system and method for flexibly routing communications transmissions in an efficient manner. In a preferred embodiment, service providers submit information to a centralized server node which comprises cost and service parameter data for routing a communication from a first location to a second location. The server node receives all of the submitted rate information, evaluates it, and generates from the information a rate-table database comprising efficient routing paths for connecting transmissions between any two locations in a communications switching network. The server may be programmed to substantially optimize its rate-table database with respect to one or more parameters, such as price, network utilization, return traffic volumes, and others.

Service requesters submit service requests to the centralized server node. The server node identifies efficient routes which meet the requesters' requirements and brokers sales of communication (or connect) time from the service providers to the service requesters. Connect time may be purchased on a transaction-by-transaction (e.g., call-by-call) basis or in larger blocks. Service requests may be submitted manually by a systems manager at the service reqester, or automatically by a telecommunications node associated with the service requester. The telecommunications node may be programmed to dynamically monitor current volume and sell or buy communication time or bandwidth on the basis of the actual and predicted requirements for connect time.

The server node administers all aspects of the network including authentication of carriers, risk management, financial transactions, settlement, and contract management, and tracking of the physical links connecting different portions of the network.

When a carrier wishes to establish communication (for example, a voice call) via a route purchased through the global network, it passes supervision to a local telecommunications node which establishes transmission via a routing path for which the carrier has purchased connect time. Alternatively, connect time to carry the communication may be purchased at the time of transmission.

When necessary, the system employs particular SS7 codes, C7 codes, C5 codes, IN codes, or other data messages (or combinations of the above based on the technological capability of various switches and gateways in the routing path) to inform a switch in the routing path that an incoming communication transaction is in transit to a different location, and is not for termination at the location of the switch. In this way, switches can distinguish terminating traffic from transit traffic and set rates for transit traffic without invoking settlement agreement accounting rates.

While the preferred embodiments are described in terms of a calling telephone and a called telephone, it will be understood that the invention may be practiced using all manner of telephone user equipment. By way of example, but not limitation, this telephone user equipment may include answering machines, fax machines, video conferencing equipment, local switches (such as in hotels or offices), voice synthesis/recognition equipment, dialers, answering services, and computers.

Moreover, while some of the preferred embodiments are primarily described in terms of a voice telephone call from a calling telephone to a called telephone, it will be understood that the global network of the present invention may embrace all classes of connectivity, including by way of example, but without limitation, data transmissions, voice over IP, ATM, FR, and virtual net. Furthermore, transmissions may be routed via paths composed of calling-legs which employ different transmission technologies.

BRIEF DESCRIPTION OF THE DRAWINGS

The above summary of the invention will be better understood when taken in conjunction with the following detailed description and accompanying drawings, in which:

FIG. 3A is a schematic representation of a template for entering rate information;

FIG. 3B is a schematic representation of a template for placing a service request;

FIG. 4 is a schematic representation of a rate-table database;

FIGS. 6A–C schematically represent illustrative states of rate-table database 400 at various points in a telephone connect time transaction;

DETAILED DESCRIPTION OF THE PREFERRED EMBODIMENTS

Figure 1A:
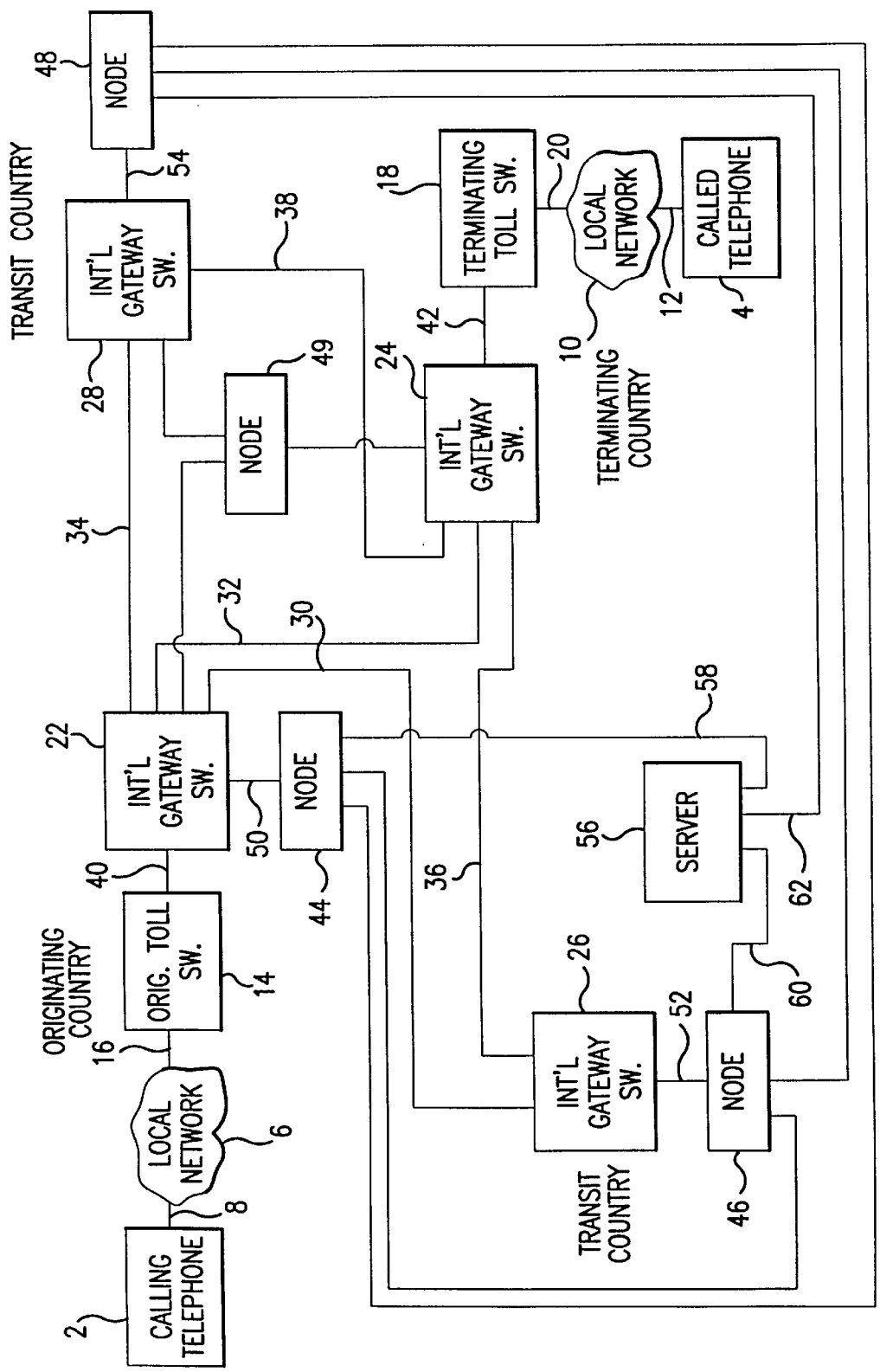
FIG. 1A is a block diagram of a telephone system architecture suitable for implementing the global network of the present invention.

FIG. 1A shows a communications system architecture, which may for example be a telephone system architecture, suitable for implementing the global network of the present invention. As shown in FIG. 1A, the architecture preferably comprises a calling telephone 2 from which a calling party may place a telephone call to a called telephone 4. Calling telephone 2 is connected to a local telephone network 6 by a local loop or another connection, such as an ISDN line, represented schematically by line 8. Local telephone network 6 and line 8 are both typically owned and maintained by the caller's local telephone service provider. Called telephone 4 is similarly connected to a local telephone network 10 via a local loop or another connection, schematically represented by line 12. Local telephone network 10 and line 12 are typically owned and maintained by the called party's local telephone service provider.

Also shown in FIG. 1A is an originating toll switch 14 typically maintained by a long distance carrier. Originating toll switch 14 is connected to local telephone network 6 preferably via both signalling and transmission lines, which are jointly schematically represented by line 16. The signalling lines may, for example, form part of the SS7 network. The transmission lines carry voice and data transmissions between local telephone network 6 and originating toll switch 14.

FIG. 1A also shows a terminating toll switch 18 typically maintained by the called party's long distance provider. Terminating toll switch 18 is connected to local telephone network 10 via both signalling and transmission, which are jointly schematically represented by line 20. The signalling lines may, for example, form part of the SS7 network. The transmission lines carry voice and data transmissions between local telephone network 10 and originating toll switch 18.

The system architecture also comprises an originating international gateway switch 22 which routes and carries overseas calls placed from calling telephone 2. Originating international gateway switch 22 forms part of a global network of international gateway switches which includes terminating international gateway switch 24, as well as transit country international gateway switches 26,28. Each pair of gateways in the international gateway network is preferably linked by signalling and transmission lines, represented schematically by lines 30–38.

As will be recognized, the international gateway switch, toll switch (terminating or originating), and local network in a particular location may be owned and maintained by the same or different business entities, depending on the location's regulatory environment.

Originating international gateway switch 22 is preferably connected to originating toll switch 14 via signalling and transmission lines, schematically represented by line 40. Similarly, terminating international gateway switch 24 is preferably connected to terminating toll switch 18 via signalling and transmission lines, schematically represented by line 42. The signalling lines may, for example, form part of the SS7 network. The transmission lines carry voice and data transmissions between the two international gateway switches and their respective toll switches.

Although FIG. 1A shows only four international gateway switches (22–28), a person skilled in the art will understand the architecture presented here may be generalized for any number of such gateways. Also, a person skilled in the art will understand that the status of a gateway as original, terminating, or transit will be determined by the SS7 signalling network or other data message such as a data message transmitted in accordance with a proprietary signalling protocol. In addition, the person skilled in the art will understand the structure of an analogous network architecture in a domestic market having different communication providers.

The system architecture further comprises a network of telecommunications nodes 44–48. Each node in the network may be associated with one of the international gateway switches 22–28 and may be connected to its respective international gateway switch via data lines 50–54. Alternatively, a telecommunication node may incorporate an international gateway switch, as for example node 49. As described in further detail below, nodes 44–49 comprise an overlay network which co-exists with the gateway network and manages the routing of certain calls carried via the gateway network.

Figure 1B:
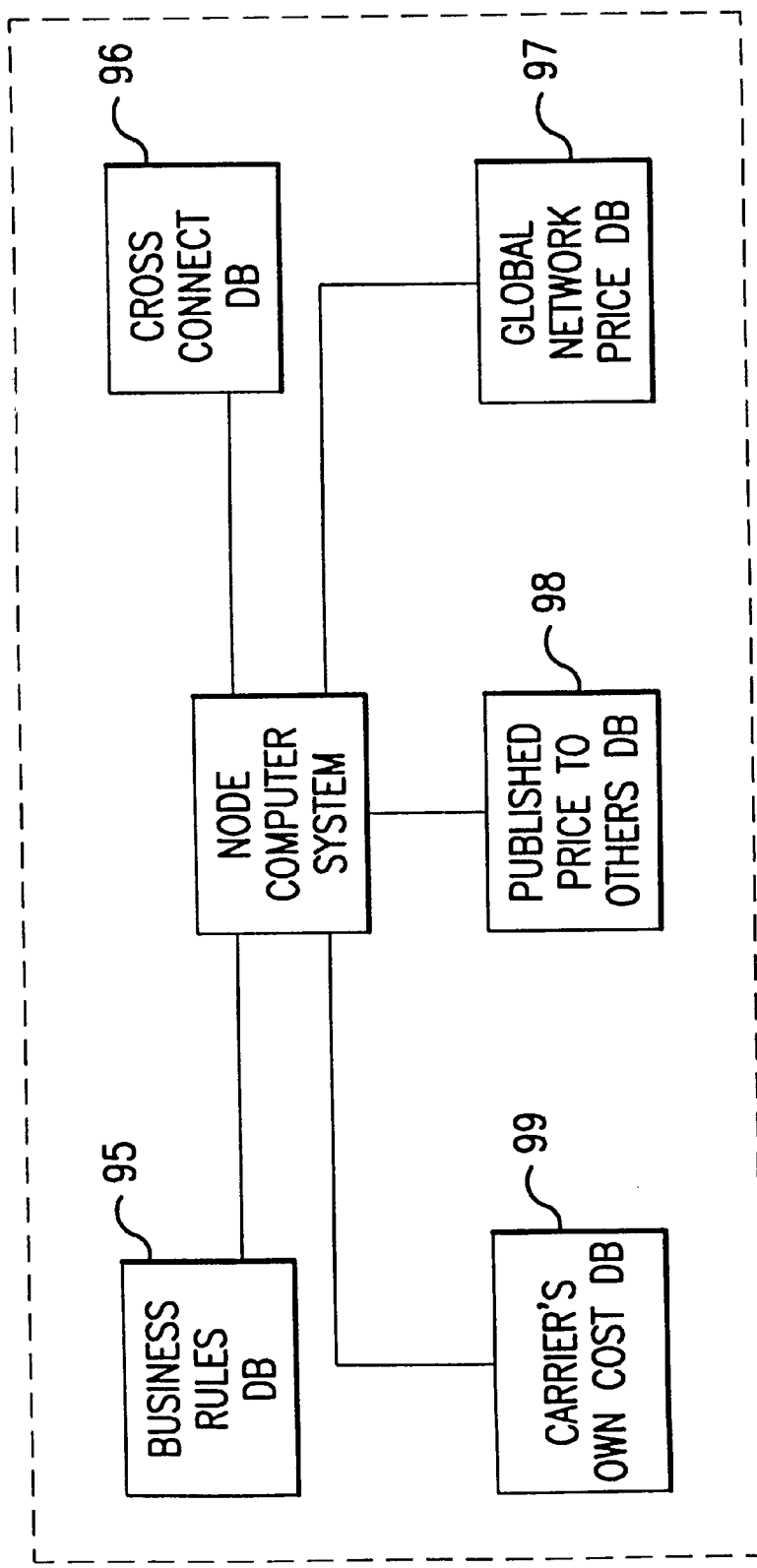
FIG. 1B is a block diagram of a telecommunication node and associated databases.

As shown in FIG. 1B, each node 44–49 is preferably provided with:

a carrier's-own-cost database 99 (one for each carrier associated with the node), which stores information regarding the internal cost to a carrier to connect a call from potential originating locations to potential terminating locations;

a published-price-to-others database 98 (one for each carrier associated with the node), which stores the price published by a carrier for connecting potential originating locations to potential terminating locations;

a global-network-cost database 97, which stores information regarding the cost of various routes for connecting potential originating locations with potential terminating locations. As described in more detail below, this information is received from server node 56 in FIG. 1A.

In addition, nodes 44–49 are further preferably provided with:

a cross-connect database 96 (one for each carrier associated with the node), which stores information regarding the physical transmission facilities maintained by a carrier, the technologies the facilities support (e.g., voice, ATM, internet, etc.), and the names and locations of other carriers with which the carrier's facilities interconnect. This information is used by the system to map the available physical interconnections of the global network.

Nodes 44–49 are also preferably provided with a business-rules database 95 (one for each carrier associated with the node), for storing business rules, the purpose of which are described below.

The telecommunications node network further comprises a server node 56. Although shown in FIG. 1A as a single node, server node 56 may instead be implemented as a distributed network of servers. Components of the distributed network may be incorporated in nodes 44–48. Each node 44–48 in the telecommunications node network is connected to server node 56 by data lines 58–62 respectively. Each data line preferably has a bandwidth of at least 64 Kb/s. As described in more detail below, server node 56 stores rate and possible routing information and determines cost-efficient routing paths for calls transmitted via the network. Server node 56 also clears transactions and coordinates the routing of all calls managed by the overlay telecommunications node network. Call routing is determined on the basis of parameters specified in service requests submitted by requesting carriers.

Figure 2:
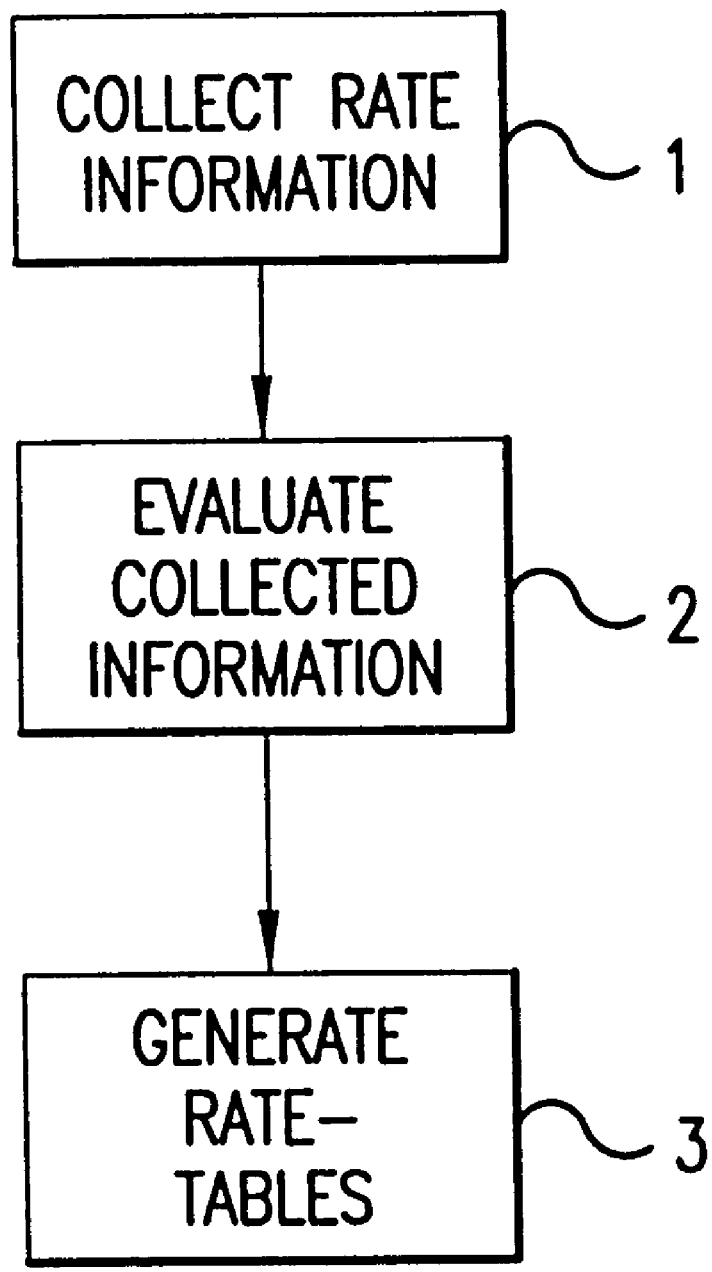
FIG. 2 is a flowchart depicting the steps performed in determining a rate-table of cost-efficient routing paths.
Figure 5:
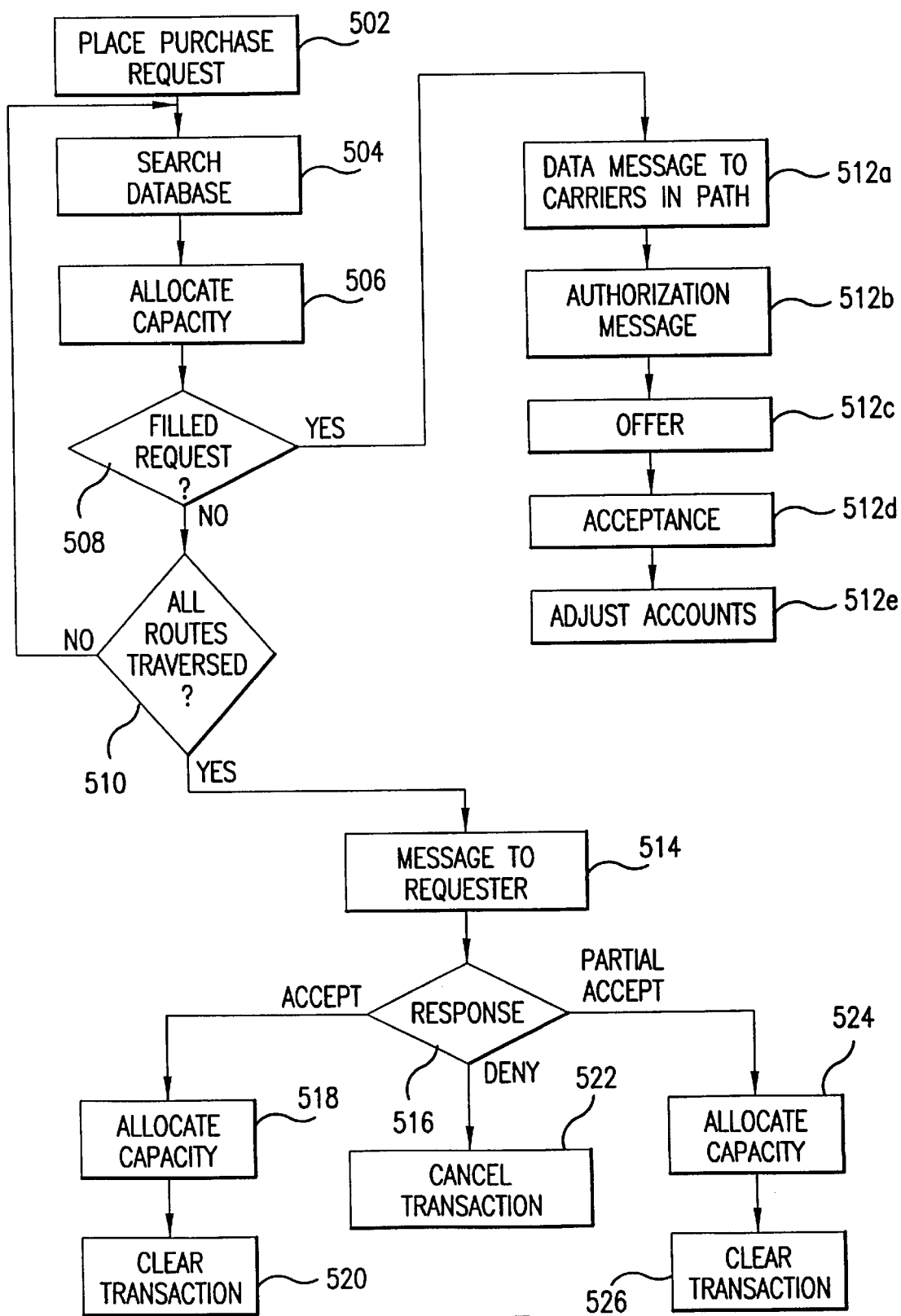
FIG. 5 is a flowchart depicting the steps performed in brokering sale of telephone connect time.

As shown in FIG. 2, server node 56 determines cost-efficient routing paths for calls connected via the international gateway network in three steps: (1) collecting rate information; (2) evaluating the collected information; and (3) generating from the collected information and a network topology map, a rate-table comprising cost-efficient routings for every pair of switches in the international gateway network.

In step (1), the system collects rate information from international carriers around the world. Each record of rate information includes the price charged by a carrier to route a call from a first location to a second location as well as call-volume capacity and service related particulars such as quality, reliability, and security of the transmission, legal restrictions (e.g., termination restrictions), post dial delay (PDD), type of service (e.g., voice, fax, data, video), and the technology employed on the link (e.g., ISDN, ATM).

Preferably, carriers will enter rate information via a template 300 which may be accessed at a world-wide-web site maintained by server node 56. Alternatively, carriers who own and maintain international gateway switches, such as switches 22, 26, and 28, or who own and maintain a node 44–48, may transmit rate information to server node 56 via telecommunications nodes 44–48. FIG. 3A illustrates one suitable arrangement for such a template. As shown in FIG. 3A, the template comprises a plurality of fields for entering information regarding an offer of service. Illustratively, these fields may include:

carrier name field 302;

carrier identification number field 304;

password field 306;

date submitted field 308;

quality field 310 (stores quality rating of the connection);

from field 312 (stores the originating location for the offered service);

to field 314 (stores the destination location for the offered service; this may take the form of a country code, if the service is available to anywhere in the country, a country and area code, if the service is available only to particular areas in the country, or an entire destination number, if service is provided only to particular called telephones);

time-available field 318 (stores the time available in minutes per month at a certain price);

number-of-circuits field 320 (stores the maximum concurrent number of calls that can be handled by the carrier);

price field 322;

hours-of-operation field 324 (stores the hours of operation during which purchased connect time may be used).

In addition, the template may preferably comprise the following fields:

service-type field (stores the type of service offered, e.g., voice, fax, data, video);

post-dial-delay (PDD) field;

valid-until field (stores the date until which the offer is open);

legal-restrictions field (stores information on legal restrictions that may affect use of the connect time);

payment terms field (stores any special payment terms required by the provider);

compression-level field (stores the maximum level of compression that will be employed in transmission);

equipment-type field (stores the type of equipment employed by the service provider);

signalling-compatibility field (stores the signalling protocols which the provider can handle, e.g., SS7, IN); and maximum-latency field (latency in this context is the delay due to congestion at a router).

Also, the template may preferably further comprise:

provide-local-termination? field;

provide-settlement? field;

via-private-line? field;

length of contract field;

via satellite? field; and termination options? field,
the purposes of which are described below.

As those skilled in the art will recognize, the above list of fields is merely illustrative of fields which template 300 may comprise. Template 300 may comprise a field for additional or different information which would aid server node 56 in making routing decisions and brokering transactions between provider carriers and requester carriers.

In a preferred embodiment, three levels of passwords are issued by the server. A first level password permits the password holder to access published rates, but does not permit the password holder to either buy or sell time via the server. A second level password permits the password holder to buy, but not sell, connect time through the server. A third level password entitles the password holder to either buy or sell connect time via the server. Thus, carriers submitting template 300 would be required to possess a third level password.

In a preferred embodiment, all routes listed on a single template are of the same quality. Thus, as shown for example in FIG. 3A, each template is preferably provided with only a single quality field. Carriers who wish to offer additional routes of a different quality, would do so on a different template. Also, all routes listed on a single template are preferably for the same service type.

Similarly, in a preferred embodiment, all routes listed on a single template are from the same originating location. Thus, as shown for example in FIG. 3A, each template is preferably provided with a single originating location field 312. Carriers who wish to offer connectivity from additional originating locations, would do so on a different template.

As shown in FIG. 3A, template 300 may comprise two or more time available fields, number of circuits fields, price fields, and hours of operation fields for each route listed by a carrier. This permits carriers to offer different prices for service at different times of the day and week. It also accomodates the practice of many carriers to employ a graduated pricing scale. In a graduated pricing scale, the rate charged for connect time up to a certain capacity (e.g., 300k minutes/month) is different than the rate for connect time above that capacity.

Illustratively, as shown in FIG. 3A, a carrier might list more than one price for service from the United States to Korce (city code 824) in Albania (country code 355). For example, for purchases under 300K minutes per month, the carrier might charge 62.5 cents per minute for calls Monday through Friday 10 P.M. to 8 A.M. and Saturday and Sunday 12 noon to 6 P.M. In contrast, for purchases above 300K minutes per month, the carrier might charge 59.8 cents per minute for calls Monday through Friday 8 P.M. to 12 midnight, and Saturday and Sunday from 5 A.M. to 6 P.M.

Also shown in FIG. 3A is an initial trading date field 326, which is filled out by server node 56 prior to transmitting template 300 to a carrier. This date reflects the first day that connect time entered on the template will be offered for sale by the global network. As noted on template 300, sellers are required to submit rate information some predetermined amount of time prior to the initial trading date (e.g., three days). This gives server node 56 time to process received rate information, and generate rate-tables therefrom, as described in more detail below.

As noted, the template may comprise additional fields not shown in FIG. 3A. For example, template 300 may comprise a field provide-local-termination? which stores a boolean value indicative of whether the carrier can provide local termination for the call in the location stored in to field 314. Local termination might not be possible for several reasons. For example, termination might be forbidden by local regulation or the carrier might not have the equipment necessary to terminate calls in a particular location.

Template 300 may further comprise a boolean provide-settlement? field. Certain carriers are required by law to route calls in a manner such that a settlement agreement with the terminating country is invoked. Settlement agreements are invoked when a call is transmitted via the Public Switched Telephone Network (PSTN) but not when routed via private or data lines. It may therefore be important for the server to establish whether a particular route offered by a service provider will trigger settlement.

Template 300 may further comprise a boolean via-private-line? field. As described in more detail below, this permits server node 56 to accomodate carriers who do not want to purchase connect time on routes which employ private lines.

Template 300 may further comprise a boolean via-satellite? field. As noted below, server node 56 may combine services provided by more than one carrier to create a calling route from a first location to a second location. As known in the art, the quality and post dial delay of a connection employing two satellite links in a route are often unacceptable. This field permits server node 56 to identify services which rely on a satellite link and avoid routing paths which employ more than one satellite link to connect the calling location and the called location.

Template 300 may further comprise a termination-options field. Illustratively, a carrier might offer fax bypass capability as a termination option. Fax bypass provides a way for substantially decreasing the cost of fax transmissions. Typically, fax transmissions are sent via telephone lines which are subject to settlement at high accounting rates. In fax bypass, a node in the route recognizes the fax tone of the fax transmission and reroutes the call via a data line. In this way, the fax may be transmitted at significantly reduced cost. In addition, as those skilled in the art will recognize, other termination options might be listed such as voice over IP.

It should be noted that the price charged by carriers may depend on the communications service offered. For example, a carrier might offer connect time at a first rate for voice calls, and at other rates for calls providing services such as: voice mail, conferencing, paging, e-mail access, internet access, fax retrieval, fax transmission, PPP access, universal personal assistant (universal mailbox). Furthermore, various levels of voice service may be provided, for example, dedicated lines and ISDN lines.

After the system collects rate information from carriers around the world regarding cost and service parameters of routing various classes of calls from a first location to a second location it proceeds to step (2) of FIG. 2. In step (2), the system evaluates the received information, in particular the service-related information such as transmission quality and reliability, and determines the accuracy of the provided parameters. Since server node 56 acts as the clearing house for telecommunication transactions, it is important that carriers purchasing time from server node 56 trust the accuracy of server node 56's published service parameters. Consequently, server node 56 independently evaluates the service parameter information received from carriers and assigns for each parameter (e.g., quality) a rating such as "A," "B," "C," etc. The evaluation is based on information about the services of the carriers previously stored at server node 56. The server may upgrade or downgrade assigned parameters based on various considerations, e.g., the historical reliability of a particular carrier. Thus, for example, if the server generally assigns satellite connections a "B" reliability rating, it might assign a particular satellite connection an "A" rating if that connection historically exhibits a higher level of reliability.

In step (3), server node 56 derives rate-tables from the collected rate information which list the cost of connecting any two locations within the telecommunication node network via various routes, and any service parameters associated with each route. Preferably, server node 56 derives separate rate-tables for each class of service that may be provided by the global network (e.g., voice, data, video conferencing, etc.). This information is then stored in a rate-table database located in server node 56. FIG. 4 illustratively represents one possible arrangement for some of the data in rate-table database 400 representative of rates charged by different carriers for various routes.

As noted in my copending application, Ser. No. 08/811,071, which is hereby incorporated herein by reference in its entirety, it will be recognized that a call from an originating location to a terminating location may be connected via a call routing path comprising several calling legs, each leg bridging two locations in a call routing path. Furthermore, as taught therein, each leg may be completed in either the forward or reverse direction. Thus, the routing paths determined and stored in rate-table database 400 will frequently be formed by combining services provided by carriers around the world.

For example, if a first carrier submits a template to server node 56 offering service from the United States to the United Kingdom at a first price, and a second carrier submits a template to server node 56 offering service from the United Kingdom to Germany at a second price, server node 56 may combine the two and offer the combination as a route from the United States to Germany at a price equal to the sum of the first price and the second price.

The associated service parameter information for a route takes into account both the evaluated parameters of the submitted rate information as well as other factors that may affect a parameter assigned to a route. For example, although a route may be comprised of two "A" quality legs, the two legs in combination may not constitute an "A" quality connection because of substantial delays in establishing the two-leg call.

Also, it should be noted that the latency of the application determines in large measure the parameters which are of importance to the call. Thus, for example, the parameters which are important for a voice call are different than those for transmitting, e.g., a fax.

As further noted in my copending patent application Ser. No. 08/811,071, the total number of possible routing paths between any two nodes in a network rises steeply as the number of nodes increases. Thus, unless the number of telecommunication nodes in the telecommunication node network is small, it is not practical to determine and store routing information for every potential route connecting any two nodes in the network. As those skilled in the art will recognize, however, the number of routes for which rate-table entries need be calculated and stored may be kept to a manageable number for several reasons.

First, although the number of theoretically possible routes may be extremely high, many routes may be immediately excluded from the rate-table calculus because of legal or other constraints. For example, local regulations may prohibit certain transactions, such as terminating traffic originated via a private line or terminating traffic except through the local gateway switch. Rate-table entries for such calling routes need not be calculated or stored.

Moreover, as those skilled in the art recognize, heuristic techniques exist for identifying with a reasonable degree of accuracy cost-efficient routes connecting two nodes in a network. Using such known heuristic techniques, the system may choose a reasonable number of cost-efficient routing paths, and calculate and store the cost and service parameters associated with each of these routing paths.

Furthermore, as known in the art, these heuristic techniques can be employed to find approximately optimum routes with respect to one parameter while imposing constraints with respect to other parameters. Thus, for example, such heuristic techniques may identify the most cost-efficient routes for each of several quality or security levels.

Illustratively, the system might calculate the costs of five (or more, depending on anticipated traffic volumes) cost-efficient routes connecting each pair of nodes for each defined level of quality and service. These five routes would be ranked according to price, and stored in rate-table database 400 at server node 56. Also, as transactions are made and routes fill up, the system may determine additional routes given the new state of the network.

Furthermore, in accordance with the teachings of my copending application, Ser. No. 08/727,681, which is hereby incorporated herein by reference in its entirety, a routing path may be constructed of several calling legs each of which employs a different technology. For example, a routing path might comprise a first leg transmitted over the public switched telephone network (PSTN), a second leg transmitted over the internet, and third leg transmitted over ATM. As taught in my application Ser. No. 08/727,681, calling legs of different technologies may be transparently linked to provide end to end connectivity between a calling party and a called party, even though some of the intermediate legs of the routing path comprise technologies with which neither the calling party nor the called party is compatible.

Once the rate-tables have been computed and stored in the rate-table database 400, copies of the database may be transmitted to each node 44–49 in the telecommunications node network. Alternatively, each node may receive only a subset of the rate-tables calculated by server node 56 on request. For example, nodes in the United States may only receive rate-tables relating to routes originating from the United States.

Updated rate-tables are preferably generated by the system on a periodic basis, for example, bi-weekly. Alternatively, if the speed and power of the system's computer hardware and software permit, rate-table generation may be performed more frequently. Indeed, with sufficient computational power, the system may update its rate-tables each time a rate or service parameter in the network changes.

Server node 56 permits carriers to purchase blocks of connect time to remote locations or to purchase connect time on a transmission-by-transmission basis. In this capacity, server node 56 acts as a clearing house for clearing transactions between provider-carriers who wish to sell connection services and requesting-carriers who wish to purchase connection services. This aspect of the invention facilitates an open market for connection rates allowing a carrier to purchase bandwidth at the lowest available price. The transaction clearing aspect of the present invention will described in connection with two illustrative examples. The first example illustrates a purchase of a block of connect time by a carrier, and connection of a call using a portion of the purchased connect time. The first illustrative example will be described in connection with FIGS. 5 and 6A–C. The second example illustrates purchase of connect time on a call-by-call basis.

Beginning with the first illustrative example, assume that a U.S. carrier wishes to purchase 10 million minutes of "A"-level quality and "B"-level reliability connect time to Germany for the month of September at a price not greater than 23 cents per minute. In step 502, the U.S. carrier places a purchase request with server node 56 requesting purchase of 10 million minutes of connect time to Germany on the above terms.

Preferably, carriers will enter purchase requests via a template 350 which may be accessed at a world-wide-web site maintained by server node 56. Alternatively, carriers who own and maintain international gateway switches, such as switches 22, 26, and 28, may transmit purchase requests to server node 56 via telecommunications nodes 44–48.

FIG. 3B illustrates one suitable arrangement for such a template. As shown in FIG. 3B, the template comprises a plurality of fields for entering information regarding a purchase request. In a preferred embodiment, template 350 may comprise the following fields:

customer identification number field 352;
  password field 354;
  originating location field 356;
  terminating location field 358;
  require-local-termination? field 360;
  require settlement? field 362;
  hours of operation field 364;
  number of minutes field 366;
  quality field 368;
  maximum post dial delay (PDD) field 370;
  allow private line? field 372;
  sort-by field 374;
  length of contract field 376; and
  acceptable carriers field 378.

As those skilled in the art will recognize, the above list of fields is merely illustrative of fields which template 350 may comprise. Template 350 may comprise a field for any information which would aid server node 56 in making routing decisions and brokering transactions between provider carriers and requester carriers.

As noted above, some provider carriers may not be able to provide local termination for certain calls. Require-local-termination? field 360 permits a requester carrier to indicate that it can provide its own local termination in the terminating location, and thus can employ carriers without termination capability to transmit the call to the called location.

As noted above, some providers may require that calls be terminated in a manner that invokes a settlement agreement. Require-settlement? field 362 permits carriers to provide that information.

Number of minutes field 366 stores the number of minutes that the carrier desires to purchase.

Maximum PDD field 370 stores the maximum number of seconds the carrier is willing to accept for connecting a calling party to a called party. This may affect the routes that may be allocated to a call since some routes, in particular those with many calling legs or satellite links may take longer to connect, than others.

As noted above, some carriers may not wish a call to be transmitted via a private line. Allow private line? field 372 permits the requesting carrier to enter this information.

In sort-by field 374, the carrier ranks in order of importance the fields in the template relating to service parameters. For example, the carrier may rank quality as the most important field, maximum PDD as second most important, etc. As described below, server node 56 uses this information when it is unable to exactly match the service request from the requesting carrier.

In length of contract field 376, the carrier may enter the desired number of months for which it wishes to buy connect time.

In acceptable carrier field 378, the requesting carrier may place constraints on the carriers via which its traffic may be routed. For example, a requesting carrier may request that its traffic be transmitted only via a top 5 carrier with respect to some parameter (e.g., quality) as ranked by server node 56. In another example, if a carrier needs to buy connect time to carry overflow traffic, it may request that it not be resold time on its own network that had originally been sold to a third party.

Upon receipt of the purchase order at server node 56, the system proceeds to step 504, where server node 56 searches rate-table database 400 in ascending-price order for routes which meet the requesting-carrier's requirements and which have available connect time for sale. When server node 56 identifies a route with available capacity it allocates that capacity to fill the requesting-carrier's purchase request, as depicted in step 506. Steps 504–506 are repeated until either the purchase request is filled or until all available routes which meet the requesting-carrier's requirements have been traversed, as depicted in steps 508 and 510, respectively.

For example, assume that FIG. 6A represents the state of a portion of rate-table database 400 at the time that the purchase request for 10 million voice minutes is received from the requesting carrier. In that case, server node 56 would complete the loop described by steps 504–510 three times in filling the requesting carrier's 10 million minute request. At the conclusion of the third loop, two million minutes of capacity from the least expensive route, four million minutes of capacity from the second least expensive route, and four million minutes of capacity from the third least expensive route would have been allocated to fill the requesting-carrier's purchase request. FIG. 6B represents the state of rate-table database 400 at the conclusion of this illustrative example.

In step 512*a*, server node 56 sends a data message to every carrier participating in the routing path informing the carrier that a buyer has been found for the allocated block of connect time. In step 512*b*, the provider carriers transmit an authorization message to server node 56, authorizing the transaction. Alternatively, the server node 56 may be pre-authorized to sell any time submitted by the carriers to the global network.

In step 512*c*, server node 56 transmits a service offer to originating node 44 offering for sale the block of allocated connect time. In step 512*d*, originating node 44 transmits an acceptance message to server node 56. In step 512*e*, server node 56 clears the transaction by adjusting the account balances of every carrier in the transaction to reflect the transfer of the allocated connect time to the requesting carrier, and the transfer of the cost of the allocated connect time to the provider carriers, as described in more detail below, and transmits a confirmation message to all parties.

In contrast, assume instead that rate-table database 400 is as shown in FIG. 6C. In that event, server node 56 would complete the loop described by steps 504–510 twice, during which two million minutes from the least expensive route and four million minutes from the second least expensive route are allocated to fill the requesting-carrier's request. In the example of FIG. 6C, however, the cost of all other routes connecting the U.S. and Germany is greater than 23 cents per minute. Consequently, after the second loop traversal, step 510 fails and the system proceeds to step 514.

In step 514, server node 56 transmits a data message to the requesting carrier, informing it that its request can not be completely filled at 23 cents per minute or less. The message also provides the requesting carrier the next best price available to secure connect time between the United States and Germany (e.g., 28 cents per minute). As depicted in step 516, the requesting carrier may respond to the message from server node 56 in three ways. First, the requesting carrier may transmit an acceptance, in which case server node 56 allocates the connect time (including the connect time at 28 cents per minute) to fill the requesting-carrier's purchase request (step 518). In step 520, server node 56 clears the transaction in a manner similar to that described in steps 512a–e.

Second, the requesting carrier may transmit a denial, in which case, server node 56 cancels the transaction, as depicted in step 522.

Third, the requesting carrier may accept the available minutes of connect time that satisfy its price requirement even though the amount of connect time is less than originally requested. In that event, server node 56 allocates the connect time which meets the requesting carrier's terms to the requesting carrier, as depicted in step 524. In step 526, server node 56 clears the transaction in a manner similar to that described in steps 512a–e.

Server node 56 maintains a running account with each carrier that either buys or sells connect time via the global network of the present invention. Thus, once authorization of a transaction has been given by server node 56 to the requesting-carrier, server node 56 adjusts the balances of the requesting-carrier and the provider-carriers to reflect the purchase of service by the requesting-carrier from the provider-carriers. Periodically (e.g., monthly), server node 56 sends bills to carriers with negative balances and forwards payments to carriers with positive balances. In this way, server node 56 manages settlement of all accounts. The server node also manages credit risks associated with the transactions. This may be accomplished in combination with a financial services company.

If a carrier that purchased a block of connect time finds that it cannot use the purchased capacity, it may resell the connect time (either as a block or one connect-transaction at a time) at a higher or lower rate than it originally paid depending on market conditions at the time of resale. The server may also support futures and derivatives markets for connect time. Carriers may also employ hedging techniques to protect themselves from large price fluctuations.

As those skilled in the art will recognize, the protocol described above for the purchase of a block of communication time is illustrative, and other protocols may alternatively be employed. For example, the carrier may request a block of connection time satisfying particular service parameter requirements without specifying a price. In that event, server node 56 may identify a block of communication time via one or more routes with the best available price which most closely matches the service parameters requested, and offer the block to the carrier.

An overview of a call-routing operation of the global network of the present invention will now be described in connection with FIG. 7. Each of the stages shown in FIG. 7 will then be explained in greater detail in connection with FIGS. 8–10.

Figure 7:
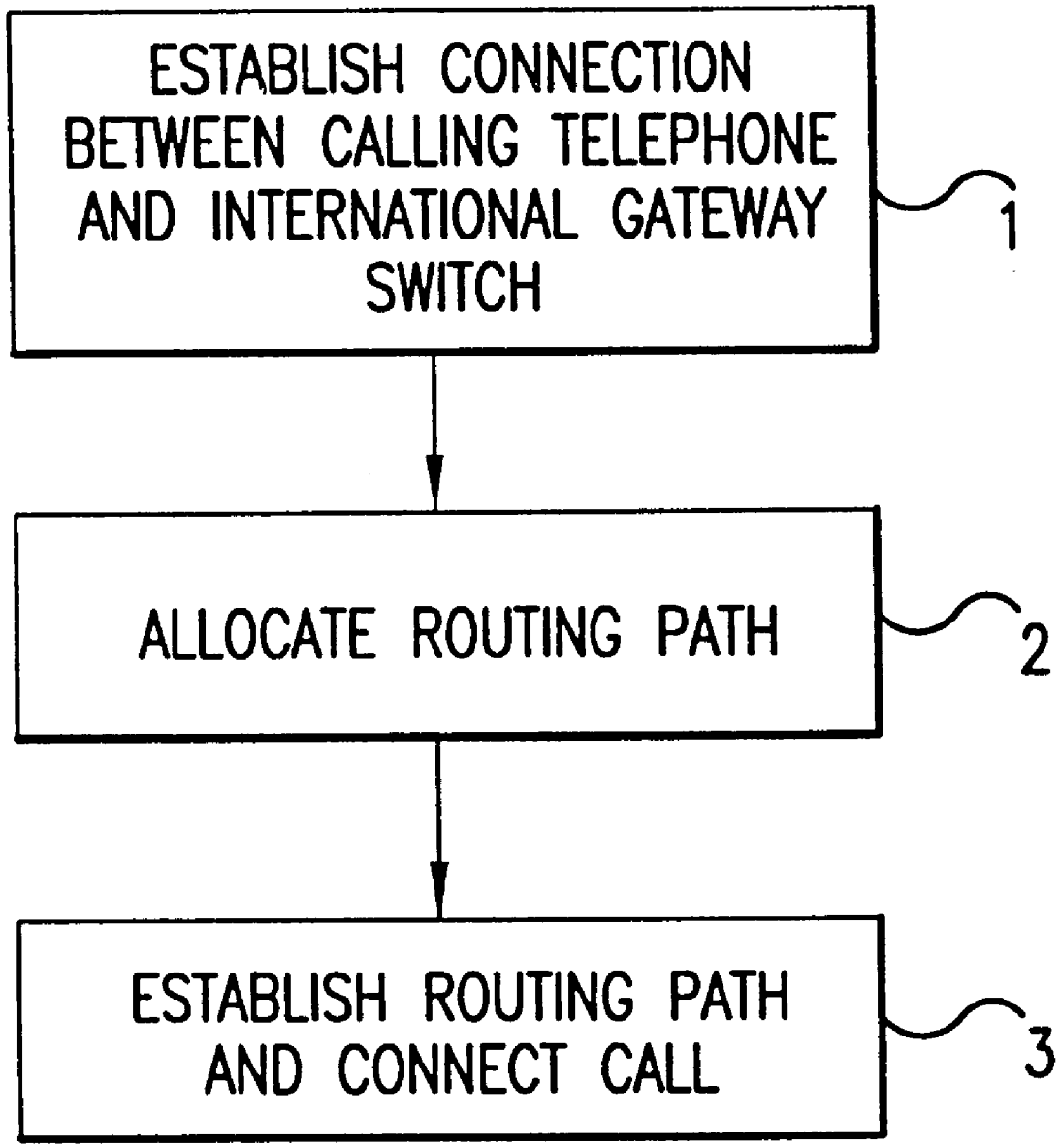
FIG. 7 is a flowchart depicting a call-routing operation of the global network of the present invention.

As shown in FIG. 7, a preferred embodiment employs a three-step process for routing any call from a calling telephone to a called telephone. In step (1), a connection is established between calling telephone 2 and originating international gateway switch 22. In step (2), the system allocates a routing path to connect the call to the called location. In step (3), the routing path is established and the calling party is connected to the called party.

The three step process will be described using an illustrative example showing the routing for one exemplary call from an originating location to a terminating location. As those skilled in the art will recognize, this example presents a relatively simple set of potential call routings. However, as noted in my copending application, Ser. No. 08/811,071, a call from an originating location to a terminating location may be connected via a call routing path comprising many calling legs, each leg bridging two locations in a call routing path. Furthermore, as taught therein, each leg may be completed in either the forward or reverse direction based on the availability of connect time and of the service type requested.

When the present application is taken together with my copending application Ser. No. 08/811,071, those skilled in the art will recognize how the teachings of the present invention may be applied to the desired call routings, including ones with many calling legs, both in the forward and reverse direction.

The illustrative call routing example will now be described in connection with FIG. 1A. Turning to FIG. 1A, assume that the originating location for the call from calling telephone 2 to called telephone 4 is the United States and that originating toll switch 14 and originating international gateway switch 22 are owned and maintained by AT&T™. Assume further that the terminating location for the call is Germany, and that terminating toll switch 18 and terminating international gateway switch 24 are owned and maintained by a German telephone company which is a monopolist. Assume further that international gateway switch 28 is located in the United Kingdom (U.K.) and is operated by British Telecom™ (BT). Finally, assume that international gateway switch 26 is located in Belgium and is operated by Belgacom™, a Belgian carrier.

Assume further that the 10 million minutes of purchased connect time described above in connection with FIG. 5, is divided between three routing paths which connect AT&T's international gateway switch 22 to the German telphone company's international gateway switch 24. With reference to FIG. 1A, the first routing path connects the call directly to Germany's international gateway switch 24 via line 32. The second routing path connects the call to international gateway switch 24 via international gateway switch 28 in the U.K. and lines 34, 38. The third routing path connects the call to international gateway switch 24 via international gateway switch 26 in Belgium and lines 30, 36.

Figure 8:
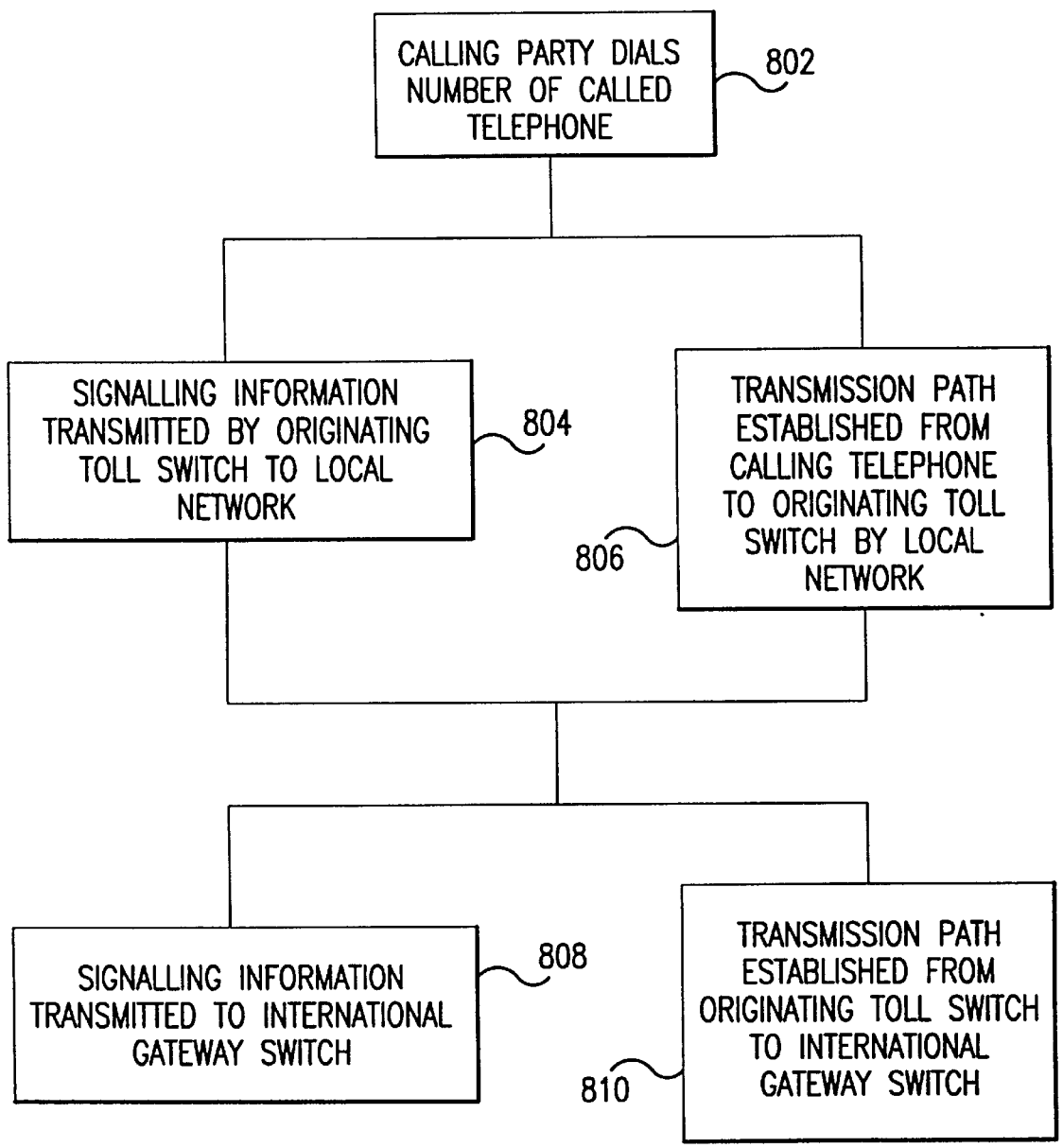
FIG. 8 is a flowchart depicting in greater detail a first portion of the call-routing operation depicted in FIG. 7.

Step (1) of the process shown in FIG. 7 will now be described in more detail in connection with the flowchart shown in FIG. 8. Turning to FIG. 8, in step 802, the caller dials the telephone number of called telephone 4 from calling telephone 2. The dialed number will typically comprise a prefix (such as 011) signifying that the call is an international telephone call. The dialed number will further comprise a country code (e.g., 49 for Germany) and area code (89 for Munich) representative of the overseas location to which the call is being placed. Local telephone network 6 is programmed to recognize overseas calls and to route such calls to the caller's long distance carrier.

Thus, in step 804, local telephone network 6 transmits appropriate SS7 signalling information regarding the call to originating toll switch 14 via line 16. Supervision is thus passed to originating toll switch 14. Concurrently, in step 806, local telephone network 6 creates a path through the local network's transmission lines to establish a connection between calling telephone 2 and originating toll switch 14.

From the signalling information, originating toll switch 14 recognizes the call as an overseas call, and routes the call to originating international gateway switch 22. In particular, in step 808, originating toll switch 14 transmits appropriate SS7 signalling information to originating international gateway switch 22, thereby transferring supervision to switch 22. Concurrently, in step 810, the long distance network creates a path through its transmission lines to establish a connection between calling telephone 2 and originating international gateway switch 22.

Thus, as described above, in step (1) a transmission connection is established between calling telephone 2 and originating international gateway switch 22, and supervision for the call is passed to originating international gateway switch 22.

In step (2), the system allocates a route for the call from calling telephone 2 to called telephone 4. Step (2) is described in more detail in connection with the flowchart shown in FIG. 9.

Figure 9:
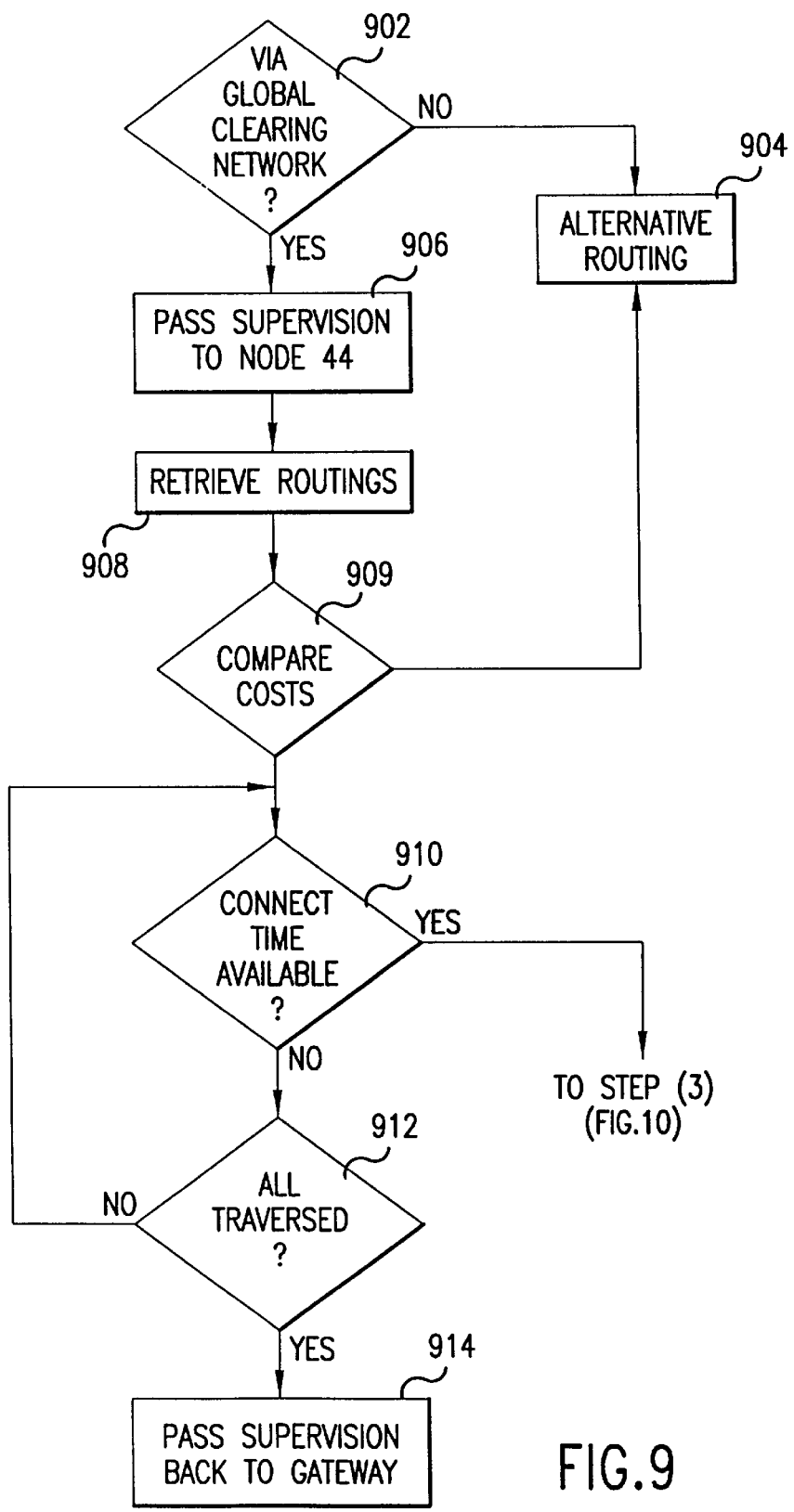
FIG. 9 is a flowchart depicting in greater detail a second portion of the call-routing operation depicted in FIG. 7.

Turning to FIG. 9, in step 902, originating international gateway switch 22 determines whether the called location is one to which it may route calls via the global network. If decision step 902 fails, international gateway switch 22 employs alternate means for connecting to the called location, as depicted in step 904. Otherwise, if decision step 902 succeeds, international gateway switch 22 passes supervision to originating telecommunication node 44, as depicted in step 906, for routing the call to the terminating location.

In step 908, node 44 retrieves from memory the routing paths on which the originating carrier has purchased connect time. As noted above, in connection with FIG. 1B, node 44 is provided with several databases 99–97 which store information on the network cost, published cost, and global network cost for connecting calls to the called location. Thus, in decision step 909, node 44 compares the various costs retrieved from databases 99–97, and determines whether to route the call via its own network connections or via a route purchased through the global network.

Decision step 909 may incorporate a procedure which applies sophisticated business rules to determine which route should be chosen to carry the traffic. For example, node 44 might be programmed to route the call via a global network route, unless the cost of that route is greater than 90% of the network cost of connecting the call.

If decision step 909 fails, the system proceeds to connect the call via an alternative route. If, however, decision step 909 succeeds, the system proceeds to step 910, where node 44 identifies a first one of the routing paths purchased via the global network and determines whether connect time is available to connect the call from calling telephone 2 to called telephone 4 via the routing path. This determination is made by transmitting a routing request to server node 56. Server node 56 queries each node in the path as to the availability of ports to carry the call. If connect time is available, server node transmits a message to that effect to node 44 and the system proceeds to step (3) where the call is connected via the routing path, as described below. Otherwise, node 44 returns to step 910, identifies a second one of the routing paths and determines whether connect time is available to connect the call from calling telephone 2 to called telephone 4. Step 910 is repeated until either a routing path with available connect time is identified or until all routes on which the carrier has purchased time have been traversed (step 912). If step 912 fails (i.e., there are no routing paths with available connect time), the system proceeds to step 914 where supervision is passed back to gateway 22 which typically may route the call via an alternative route such as the regular settlement route or other overflow route. If no other route is available, a message may be transmitted to calling telephone 2 informing the caller that all circuits are busy and asking the caller to place his call again at a later time.

Once a route with available connect time is identified, the system proceeds to step (3) of FIG. 7, where the identified route is established and the caller is connected to the called party. Step (3) of FIG. 7 will be described in detail in connection with FIG. 10.

As noted in the background of the invention above, it has not been possible to date to cost-effectively and dynamically route calls via the international gateway network because of the lengthy contractual negotiations and physical reconfiguration which were required to establish new call routings. Without reconfiguration, the international gateway switches were unable to distinguish incoming terminating traffic from incoming transit traffic or redirect on the fly without human intervention. As a result, all incoming traffic was treated as terminating traffic subject to high settlement agreement accounting rates or was based on existing prenegotiated contracts and links which could not be easily modified. As described in more detail below, the present invention overcomes this drawback of the prior art and permits dynamic routing of transit and terminating traffic to gateway switches in the gateway network or any other network.

For purposes of this example, assume that the routing decision made in step (2) of FIG. 7 above is that the call from calling telephone 2 to called telephone 4 should be routed via international gateway switch 28 in the U.K.

Figure 10:
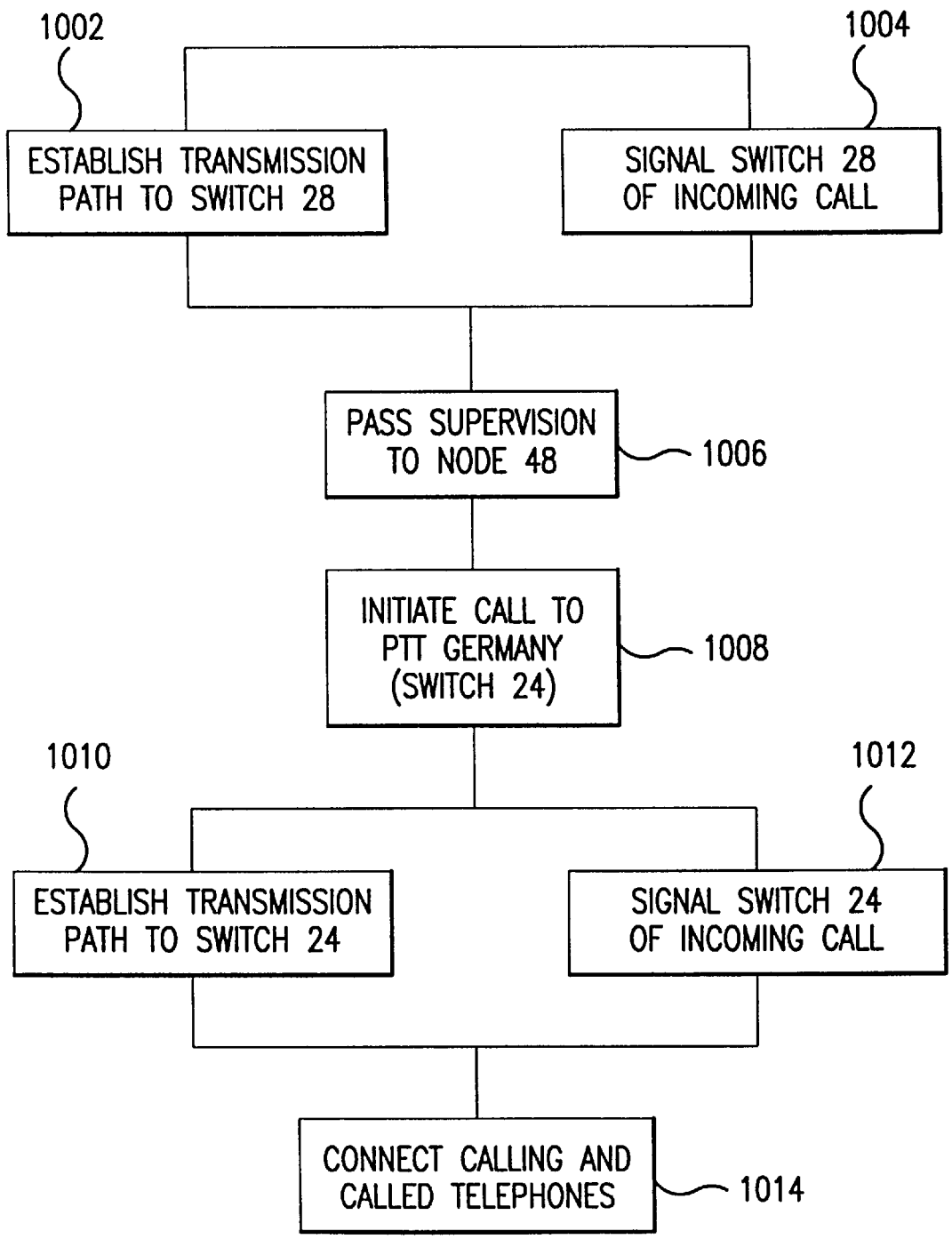
FIG. 10 is a flowchart depicting in greater detail a third portion of the call-routing operation depicted in FIG. 7.

The system then proceeds to step 1002 of the flowchart depicted in FIG. 10. In step 1002, AT&T's international gateway switch 22 establishes a transmission path to carry the call to international gateway switch 28 based on instructions from node 44 regarding routing, signalling, the appropriate port with which to connect, and the destination number to employ. Concurrently, in step 1004, node 44 transmits an SS7 (or C7 or other appropriate protocol) message to international gateway switch 28 via line 34.

The C7 message comprises a code which informs international gateway switch 28 that the call is not for termination in the U.K. (i.e., that the call is a transit call), and instructs switch 28 to pass supervision of the call to telecommunications node 48.

The particular C7 code used to inform international gateway switch 28 that the call is a transit call is unimportant as long as the gateway switch is configured to recognize the C7 code as indicating a transit call. At present, however, at least two potential codes for accomplishing this task are contemplated. First, the system may employ a fictitious area code which does not exist in the U.K. as a prefix to the dialed number transmitted as part of the C7 message. Also, a special country code can be used for this purpose. When international gateway switch 28 sees the fictitious area code, it immediately recognizes the call as a transit call, and passes supervision to node 48. Alternatively, a new class of service code may be defined and transmitted as part of the C7 message. The U.K. gateway switch recognizes the service code and identifies the call as a transit call.

Also, some telecommunication nodes may acquire a point code, thus permitting a gateway to direct traffic to the node without employing one of the codes described above.

In either event, the system proceeds to step 1006 wherein international gateway switch 28 passes supervision of the call to node 48. In step 1008, node 48 initiates a call via international gateway switch 28 to the telephone number of called telephone 4 in Germany. Node 48 may be informed that the call is to be routed to Germany via the SS7 network or alternatively via line 62.

In step 1010, international gateway switch 28 establishes a transmission path to carry the call to Germany's international gateway switch 24. Concurrently, in step 1012, international gateway switch 28 transmits an C7 signalling message to international gateway switch 24 informing switch 24 of an incoming call for termination in Germany. In step 1014, International gateway switch 24 routes the call through terminating toll switch 18 and local network 10 to called telephone 4, thus establishing a connection between the calling party and the called party.

When a call is terminated, every participating node in the routing path transmits a data message to server node 56 informing node 56 of the details of the call, including the length of the call. Server node 56 uses this information to update account balances for every carrier who participated in the routing path.

As noted in my copending application Ser. No. 08/811,071, the speed of the system may be increased by synchronizing the concurrent establishment of two or more calling legs in a routing path. Thus, in the illustrative example given above, several of the steps might be performed in parallel such as establishing transmission paths from the U.S. to the U.K. and from the U.K. to Germany, in order to increase the speed of the system. For example, upon receiving a request or instruction to route a call, the U.K. node may verify that trunks are available to transmit the call to Germany, and that the destination, such as called phone 4, is available.

It should be noted that when the gateway switches described above are IN compatible, server node 56 is aware of this fact and informs node 44. Node 44 may then interact directly with the U.K. gateway using IN signalling rather than SS7 or C7. In this event, node 44 need not interact with U.K. node 48. Moreover, node 44 may employ IN signalling to communicate directly with gateway 24 to determine, for example, whether called telephone 4 is off-hook.

More generally, when the present disclosure is taken in combination with my copending application Ser. No. 08/728,670, which is hereby incorporated herein by reference in its entirety, it will be recognized that the present invention employs data lines to provide data signalling external to the communications network in order to facilitate the efficient routing of calls. As will be recognized, the degree to which external data signalling is required will depend on the ability of the network signalling capability to carry the data messages necessary to operate the overlay network of the present invention.

In the first illustrative example described above, a requesting carrier purchased a block of connect time. Alternatively, the purchase of connect time may be on a call by call basis. A second example illustrating such a transaction will now be described in connection with FIGS. 11A–B.

Figure 11A:
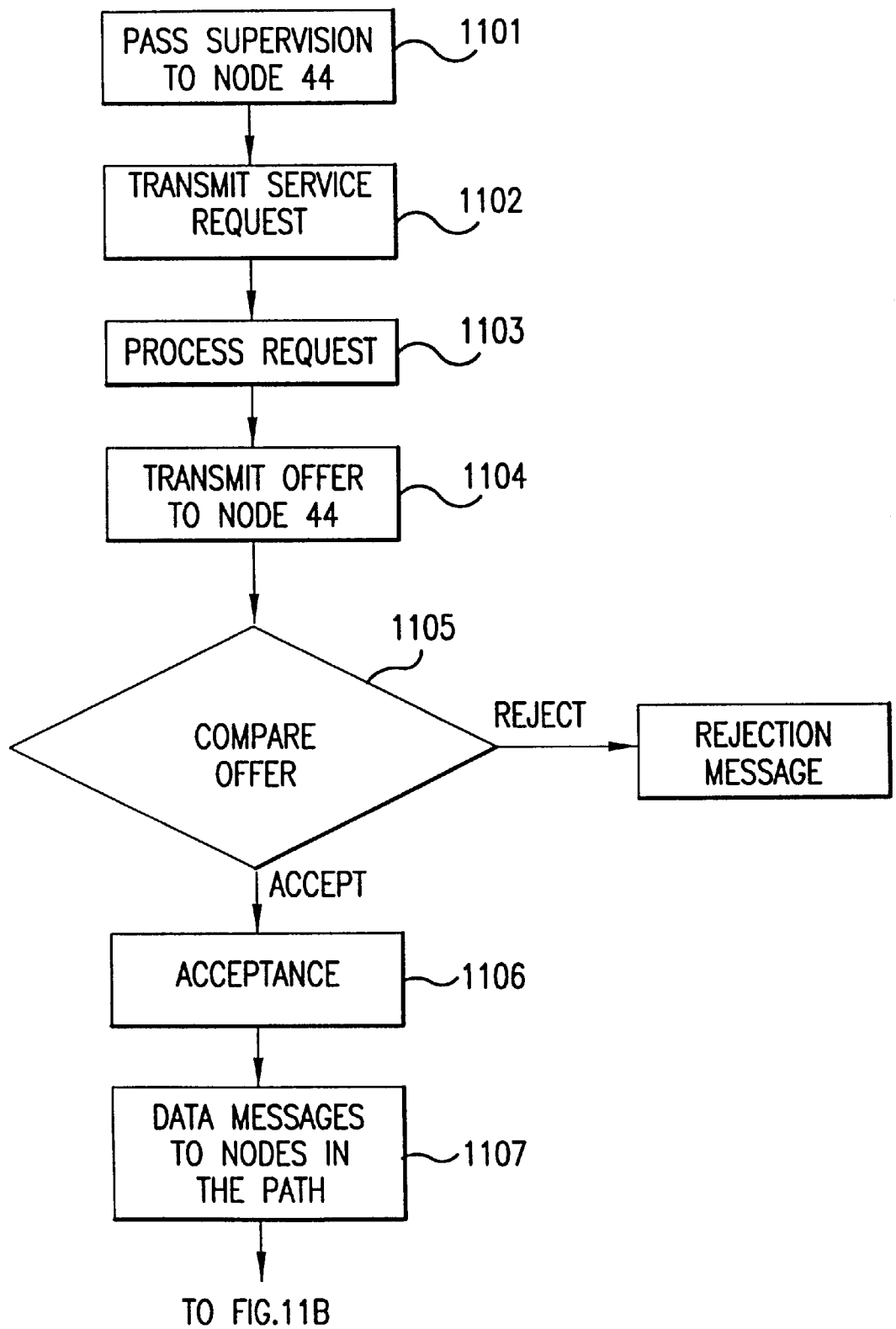
FIGS. 11A–B are a flowchart of a protocol for purchasing connect time on a transaction-by-transaction basis.
Figure 11B:
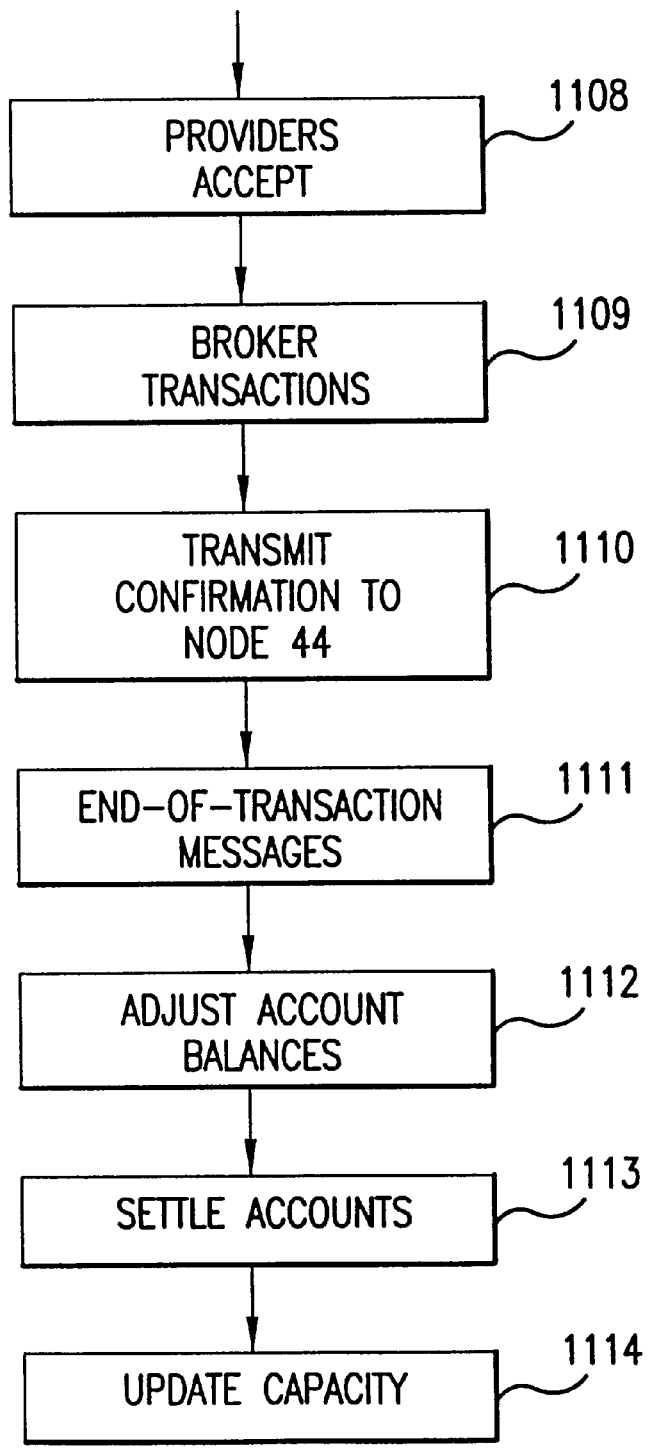

As shown in FIGS. 11A–B, the system employs a 14-step protocol to clear a call-by-call connection transaction. In step 1101, when a call is received at gateway 22, it passes supervision over the call to node 44. In step 1102, node 44 transmits a service request to at least one server node 56. For purposes of this illustrative example, it will be assumed that node 44 transmits a request to only one server node 56. As explained in greater detail below, however, node 44 may transmit a service request to a plurality of server nodes 56, each of which may be optimized for a different parameter, such as price or network utilization.

In step 1103, server node 56 processes the request and identifies the routing path which best meets the requirements of the requesting node given the optimization priorities of server node 56. For example, assuming that server node 56 is programmed to optimize routes by price, server node 56 would identify the least expensive routing path which meets the service parameter requirements of node 44.

In step 1104, server node 56 transmits an offer of service to node 44 comprising the particulars of the identified route.

In decision step 1105, node 44 compares the offer to other potential routes which might be employed to connect the call from calling telephone 2 to called telephone 4. This determination may be based on sophisticated business rules supplied to node 44 by the requesting carrier. For example, as noted above in connection with FIG. 1B, node 44 is provided with a network cost database which stores the carriers internal cost of connecting a call from gateway 22 to the called location. Node 44 might be programmed to accept the offer from server node 56 only if it is 10% less expensive than the network's own internal cost of completing the call.

If decision step 1105 fails, node 44 transmits a rejection message to server node 56. This ends the protocol.

Otherwise, if decision step 1105 succeeds, the system proceeds to step 1106 where node 44 transmits an acceptance to server node 56.

In step 1107, server node 56 transmits data messages to every node in the routing path requesting service to connect the call. In step 1108, the nodes in the path agree to provide the service, and transmit a data message to server node 56 to that effect.

In step 1109, server node 56 brokers the financial transactions resulting from establishment of the routing path. As part of step 1109, server node 56 reserves a portion of the requesting carrier's credit limit to cover the cost of the call. The reserved dollar amount is chosen based on an estimate of how long the call will last. This estimate may be based on historical call lengths.

In step 1110, server node 56 transmits a confirmation message to node 44, confirming purchase of connect time on the identified routing path. The message also preferably comprises information concerning the port on gateway 22 via which the call is to be routed, as well as destination numbers and other service data necessary to complete the call to the called location.

In step 1111, at the conclusion of the call, each node in the routing path transmits an end-of-transaction message to server node 56 which may preferably include the length of the call.

In step 1112, server node 56 adjusts the account balances of all carriers and node operators participating in the routing to reflect the cost of the call. In step 1113, server node 56 settles the accounts of all carriers and node operators by transmitting payment to parties with positive balances and bills to parties with negative balances. Step 1113 may be performed periodically, e.g., monthly.

In step 1114, server node 56 updates capacity to reflect that ports that had been employed to carry the call are now clear and records the number of minutes of network time that were used to carry the call.

The nodes may also provide routing decisions based on sophisticated business considerations submitted by a requester carrier to its local node. Assume, for example, that a carrier only wishes to buy connect time via the global network if the cost is below 20% below its own cost unless it needs the connect time for overflow traffic. This business consideration can be transmitted to its local node which will evaluate routes proposed by server node 56 in accordance with the transmitted business considerations. Server node 56, however, will generally not have access to these proprietary business considerations, unless the system is a closed network where node 56 is employed to optimize capacity, rather than price, as described, for example, below.

As noted, in the above-described embodiments originating node 44 was shown to communicate with server node 56, which constituted a single source of rate information and a single exchange for communication capacity. In other embodiments, however, several servers may be used, which communicate with node 44 in the same or similar way as discussed above. In such another embodiment each node 44–49 would be connected to one or multiple servers.

In a multiple server embodiment, each server node 56 may rank potential routing paths in accordance with a particular parameter or set of parameters. For example, some servers may rank routes by price. Other servers may rank routes in a manner designed to maximize network utilization. A given company may offer its communication capacity on one server or on multiple servers. Because each server may rank routes according to different priorities, a particular service query from an originating node might yield different proposed routes from each of the server nodes 56.

Consequently, an originating node, such as node 44, connected to multiple server nodes 56 must store selection rules for determining which route to choose from among the several that may be proposed by the different server nodes 56. The decision in selecting a server may depend on various business factors and conditions specific to a carrier. For example some carriers may first transact business with servers having lower transaction surcharge, while others may prefer servers that are known for availability of high volumes of connect time for sale.

A person skilled in the art will understand that a specific selection of choices may be programmed based on a carrier's specific business needs. For example certain carriers might have an affiliation or a special volume discount with a company providing communication capacity which is available on only one specific server. In such a case, the carrier might first attempt to purchase communication capacity from the specific server which offers the affiliated company's connections before purchasing capacity on other servers. In another example, the carrier might prefer to purchase connect time from a server with which it is affiliated, unless the price offered by that server is, e.g., 10% greater than the price available from a second server node 56 with which the carrier has no affiliation. Node 44 is programmed to implement these business rules supplied to it by the carrier.

The present invention also permits a carrier who owns or is associated with a node 44–49 to dynamically control its capacity in accordance with a set of business rules. With respect to this aspect of the invention, if a node receives a volume of calls that exceeds or is close to the limit of its previously purchased connection capacity to a given destination, the node can contact the server with a request to purchase additional minutes of connect time to accommodate this unforeseen demand. Additional capacity may either be requested automatically when a call volume reaches a specified threshold or by a system operator who monitors communication traffic conditions.

Furthermore, a node may include a capability to adjust its resources based on the actual and anticipated communication traffic conditions. It is known to keep track of call traffic volume to a given destination and to store measurements of the call volume periodically in a resource utilization database. Such data representing network utilization coupled with other variables, such as time of the day and day of the week, may provide a basis for a reasonable prediction of the capacity utilization during the next time interval, for example the next hour.

Then, if anticipated utilization exceeds a desired utilization level, the node would purchase additional capacity, e.g. connect time to a destination, for the next time interval. Conversely if the predicted utilization is lower than desired, node would offer excess minutes during the next time period for sale.

For example, if the desired utilization is 80% of the purchased capacity, a node will purchase or sell capacity so as to adjust anticipated utilization to 80%.

Figure 12:
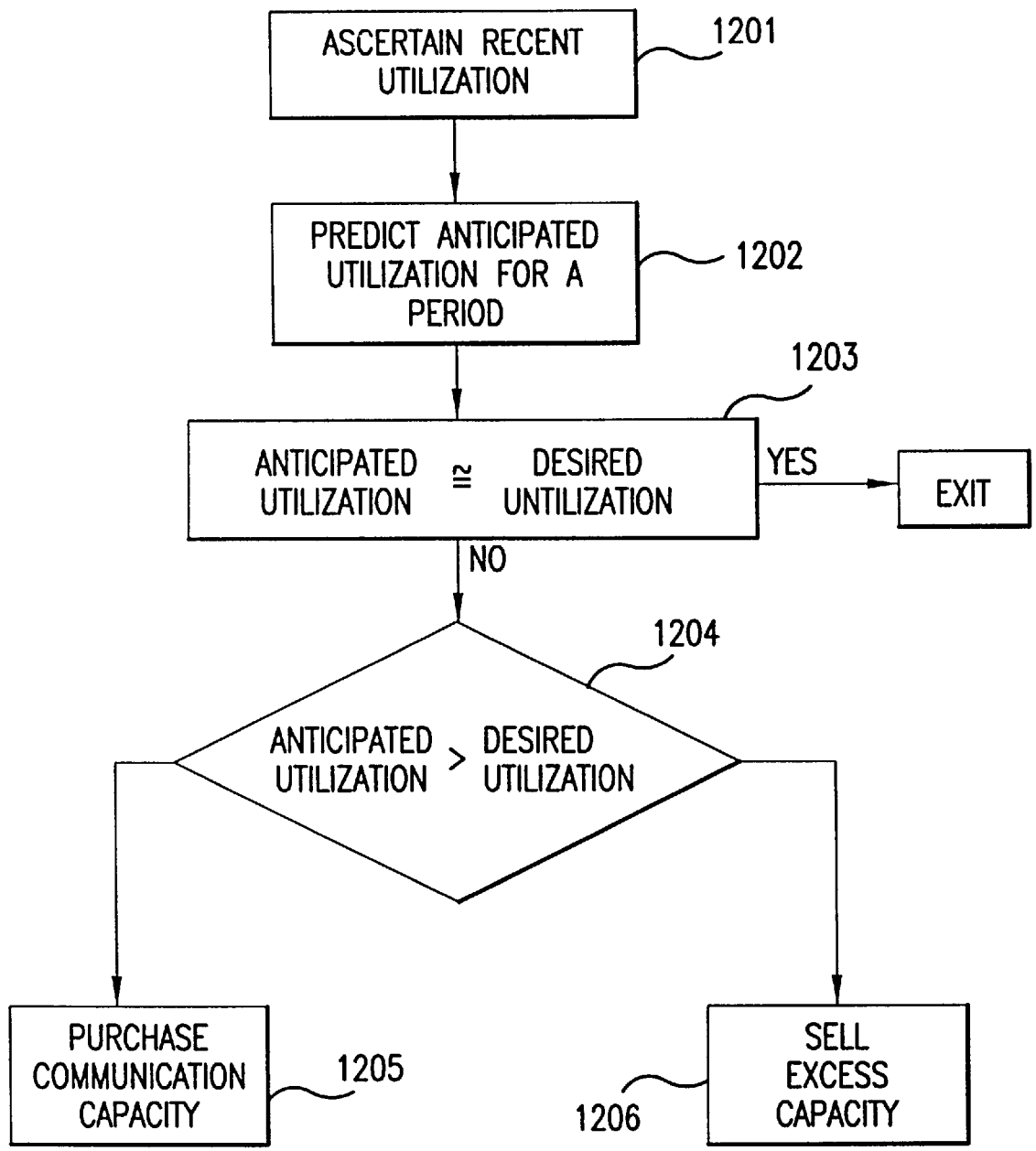
FIG. 12 is a flowchart depicting dynamic control of available communication capacity by a telecommunication node.

FIG. 12 illustrates a flowchart of this functionality. At 1201 the system ascertains recent utilization by referring to the utilization database and at 1202 predicts, based on recent utilization and other factors such as time of the day and day of the week, the anticipated utilization for the next period, e.g., an hour. At 1203, if the anticipated utilization for a period is approximately the same as the desired utilization, this execution terminates until the next period. (Of course, as discussed before, if volume rises unexpectedly the node should react to such a situation and purchase additional capacity automatically or upon operator's instruction).

If anticipated utilization materially deviates from the desired utilization (test 1204), the node proceeds to purchase or sell capacity for the next period accordingly. If utilization is predicted to exceed the desired utilization, at 1205 the node purchases additional capacity so that the anticipated utilization is at the desired level. Similarly if utilization is predicted to be lower than desired, at 1206 the system sells excess capacity to bring anticipated utilization to the desired level.

The desired utilization may take the form of a formula which incorporates business considerations. As a simple example, the node may be instructed to maintain utilization at 80% of capacity unless purchase of additional connect time is above a certain price, or sale of excess connect time is below a certain price. The business rules applied by the node may be substantially more sophisticated than the example described above, and may take into account any factor desired by the carrier.

While the invention has been described in conjunction with specific embodiments, it is evident that numerous alternatives, modifications, and variations will be apparent to those skilled in the art in light of the foregoing description.

For example, although illustrated primarily in connection with international telephone calls, the present invention may also be applied to improve the efficiency of a network located within one country.

Also, although illustrated primarily in connection with a public network comprised of a plurality of carriers, the present invention may also be employed to efficiently manage a private network, or a network made up of facilities maintained by affiliated carriers. In this context, server node 56 will frequently be programmed to rank routing paths according to a parameter other than simple price. For example, the network may rank and allocate routes in a manner designed to maximize utilization of the network facilities.

I claim:

1. A method for providing a market for facilitating clearing of telephone connection transactions, comprising:

collecting service offers comprising a plurality of parameters including rate information from a plurality of sellers of telecommunication services, each service offer constituting an offer to sell a block of telecommunications connect time for a route connecting a pair of locations in a network, each seller having an account stored in a memory, each account having a balance;

identifying one or more routes for routing calls from a first location to a second location using the collected information, each of the identified routes comprising one or more calling legs, service for each calling leg being provided by a service provider;

receiving service requests from a plurality of buyers of telecommunications services, each service request requesting purchase of telecommunications connect time, each request comprising a plurality of parameters including an originating location and a terminating location for the requested connect time, each buyer having an account stored in a memory, each account having a balance;

matching service requests provided by buyers to at least a portion of one or more service requests provided by sellers;

brokering a transaction that effects a transfer of ownership of at least a portion of the telecommunications connect time specified in the matched service offers from each seller to a respective buyer, the buyer not being informed of the identity of the seller before the transfer of ownership and the seller not being informed of the identity of the buyer before the transfer of ownership;

updating the account balance of each seller and buyer of telecommunications connect time.

2. The method of claim 1 further comprising the steps of:

classifying the identified routes in accordance with the parameter information.

3. The method of claim 1, wherein at least some of the telecommunication service offered for sale is service that had previously been purchased by the seller.

4. The method of claim 1, wherein a single entity dynamically monitors trends relating to brokered sales and submits either offers or requests on the basis of expected supply and demand for such services.

5. The method of claim 1, further comprising:

authenticating the ability of carriers to provide telecommunication services offered for sale.

6. The method of claim 5, wherein the authentication is based at least on a carriers' historical performance.

7. The method of claim 1, wherein at least one service request is filled by two or more service offers.

8. The method of claim 1, further comprising:

predicting on the basis of a plurality of factors the anticipated demand for services via a telecommunications switch for an upcoming predetermined period of time;

comparing the anticipated demand to the communication services available for the predetermined period of time to the telecommunications switch;

purchasing communications services via a clearing node when the comparison indicates that the anticipated demand exceeds a predetermined threshold; and selling communications services via the clearing node when the comparison indicates that the anticipated demand fails to exceed the predetermined threshold.

9. The method of claim 8, wherein the prediction is based at least in part on recent utilization patterns for the telecommunication switch.

10. The method of claim 8, wherein the decision to sell or buy communication services is additionally a function of a set of predefined rules.

11. The method of claim 1 wherein at least one of the service offers is made by a seller who will not participate in providing the offered service.

* * * * *